(12) United States Patent
Touura

(10) Patent No.: US 7,652,790 B2
(45) Date of Patent: Jan. 26, 2010

(54) IMAGE FORMING APPARATUS, GRADATION CORRECTION METHOD AND CONTROL METHOD OF IMAGE FORMING APPARATUS

(75) Inventor: Kousuke Touura, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 620 days.

(21) Appl. No.: 10/783,370

(22) Filed: Feb. 20, 2004

(65) Prior Publication Data

US 2004/0246545 A1 Dec. 9, 2004

(30) Foreign Application Priority Data

Jun. 9, 2003 (JP) .............................. 2003-163758

(51) Int. Cl.
*G06F 15/00* (2006.01)
(52) U.S. Cl. .................. 358/1.9; 358/1.5; 358/521; 358/504; 399/49; 399/74
(58) Field of Classification Search ............... 358/3.05, 358/504, 521, 3.23, 2.1, 3.26, 1.9, 538; 399/15, 399/49, 18, 74; 382/164, 176, 302
See application file for complete search history.

(56) References Cited

U.S. PATENT DOCUMENTS 5,600,404 A * 2/1997 Ando et al. ................... 399/18
5,754,920 A 5/1998 Tanaka et al.
6,285,839 B1 * 9/2001 Tanaka et al. ................ 399/49
6,462,838 B1 * 10/2002 Hirata et al. ............... 358/3.05
6,898,381 B2 * 5/2005 Maebashi et al. ............. 399/15

FOREIGN PATENT DOCUMENTS

| JP | 6-148992 A | 5/1994 |
| JP | 9-230643 A | 9/1997 |
| JP | 2001-142266 A | 5/2001 |
| JP | 2002-014505 A | 1/2002 |

OTHER PUBLICATIONS

Japanese Office Action dated Apr. 28, 2009 (2 pages), and English translation thereof (4 pages), issued in counterpart Japanese Application Serial No. 2003-163758.

* cited by examiner

*Primary Examiner*—King Y Poon
*Assistant Examiner*—Jamares Washington
(74) *Attorney, Agent, or Firm*—Frishauf, Holtz, Goodman & Chick, P.C.

(57) ABSTRACT

An image forming apparatus includes: an image forming unit for forming a correcting image for correcting gradations of an output image, on a bearing body; a sensor for measuring reflected light quantity of the correcting image formed on the bearing body; a gradation correcting unit for correcting the gradations of the output image, based on a measurement result of the measured reflected light quantity of the correcting image; and a timing correcting unit for detecting a shift of measurement timing, based on the measurement result by the sensor, and for correcting the detected shift of the measurement timing.

24 Claims, 13 Drawing Sheets

FIG.4A
| GRADATION PATTERN | DENSITY STEP | | INPUT DENSITY VALUE |
|---|---|---|---|
| GRADATION PATTERN A | 5 | ■ | 216 |
| | 4 | | 162 |
| | 3 | | 108 |
| | 2 | | 54 |
| | 1 | □ | 0 |
| GRADATION PATTERN B | 5 | ■ | 234 |
| | 4 | | 180 |
| | 3 | | 126 |
| | 2 | | 72 |
| | 1 | | 18 |
| GRADATION PATTERN C | 5 | ■ | 255 |
| | 4 | | 198 |
| | 3 | | 144 |
| | 2 | | 90 |
| | 1 | | 36 |
FIG.4C
| GRADATION PATTERN | DENSITY STEP | | INPUT DENSITY VALUE |
|---|---|---|---|
| GRADATION PATTERN A | 5 | ■ | 255 |
| | 4 | | 192 |
| | 3 | | 128 |
| | 2 | | 64 |
| | 1 | □ | 0 |
| GRADATION PATTERN B | 5 | ■ | 255 |
| | 4 | | 192 |
| | 3 | | 128 |
| | 2 | | 64 |
| | 1 | □ | 0 |
| GRADATION PATTERN C | 5 | ■ | 255 |
| | 4 | | 192 |
| | 3 | | 128 |
| | 2 | | 64 |
| | 1 | □ | 0 |
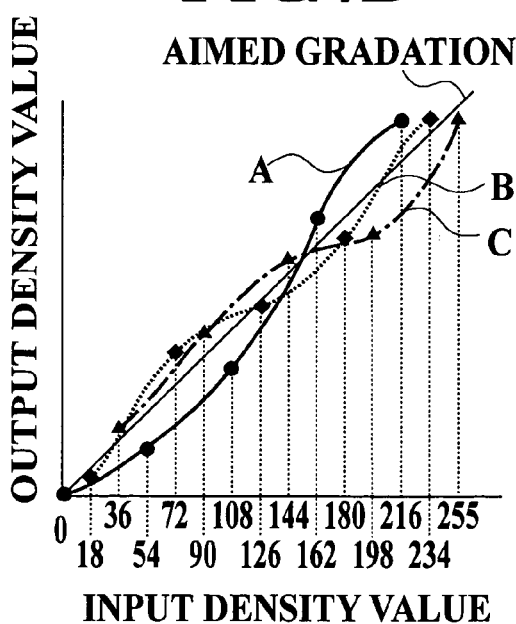
FIG.4B
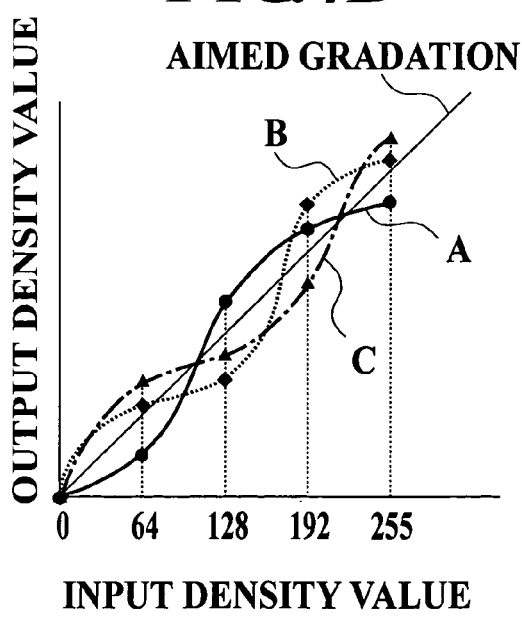
FIG.4D

IMAGE FORMING APPARATUS, GRADATION CORRECTION METHOD AND CONTROL METHOD OF IMAGE FORMING APPARATUS

BACKGROUND OF THE INVENTION

1. Field of the Invention

The present invention relates to a printer, a facsimile machine, a copying machine and a compound machine of them (hereinafter referred to as an image forming apparatus), which form an output image on a recording medium such as a sheet of paper based on input image data. The present invention also relates to a gradation correction method for correcting the gradations of an output image, and control method of the image forming apparatus.

2. Related Art

In an image forming apparatus based on an electrophotographic system such as a laser printer, printing is performed by undergoing the processes of exposure, development, transfer and fixing. To put it concretely, first, in the exposure process, an electrostatic latent image of an image to be printed is formed on the surface of a photosensitive drum by the irradiation of an exposure beam the light quantity of which is modulated In accordance with the image data of the image to be printed. Hereupon, the light and shade, or the gradation, of the image can be expressed by modulating the intensity of the exposure beam, or by controlling an exposure time. Next, in the development process, toner is blown to the photosensitive drum, and the electrostatic latent image is developed on the photosensitive drum as a toner image. In the transfer step, the toner image is primarily transferred from the photosensitive drum to a transfer belt, and then the transferred toner image is secondary transferred from the transfer belt to a sheet of printing paper. In the fixing process, the printing paper is heated, and thereby the toner image is fixed.

In case of a color printer using a plurality of color toner, the so-called tandem system color printer is well known. In the tandem system color printer, an exposure unit and a development unit are provided for each color. Toner images of respective colors are superposed one upon another on a transfer member such as the transfer belt, and then the superposed toner images are transferred on the printing paper in a lump.

In an image forming apparatus based on the electrophotographic system described above, there are some cases where output density values of the apparatus change owing to the dispersion of respective characteristics of the apparatus and the influences of the environment in which the apparatus is used (the influences of temperature, humidity and the like), and thereby desired output gradations according with input density values cannot be obtained.

Accordingly, a conventional image forming apparatus performs a gradation correction of an output image at every fixed period. As shown in FIG. 13, the gradation correction of the conventional image forming apparatus uses a correcting image including a gradation pattern composed of a plurality of gradations, or patch-shaped density steps changing in density by steps. The conventional image forming apparatus detects output densities of the correcting image which has been transferred on a transfer belt through a photosensitive drum by measuring the reflected light quantities of the correcting image with an optical sensor, and performs the gradation correction of the output image based on measurement results (see, for example, JP-Tokukai-2002-14505A and JP-Tokukai-2001-142266A).

To put it concretely, as shown in FIG. 14, the conventional image forming apparatus calculates a measured curve by plotting measured density values at respective density steps measured by the sensor as output density values to input density values. Then, a correction curve having an inverse characteristic of the measured curve with respect to a straight line indicating aimed output gradations is obtained, and output gradations are corrected based on the correction curve.

However, in the case where the distance from the position where a toner image is developed to the position where the toner image is measured by the sensor on the transfer belt is long, there are some cases where the driving speed of the transfer belt has changed until the density of the correcting image is measured by the sensor owing to deflection of the transfer belt, or mechanical errors of respective members such as a drive motor, gears and the diameters of conveying rollers, each being for driving the transfer belt. As the measurement timing by the sensor, specified timing is previously set in order that density measurements may be performed at correct positions of respective density steps based on the turning speed of the transfer belt, the positions where the gradation pattern is formed, and the patch sizes of the respective density steps. However, when the turning speed of the transfer belt changes, the measurement timing is shifted, and consequently the densities at positions different from the positions where the densities should be measured originally are measured. Because such measurements do not bring about correct output density values to the input density values, erroneous gradation corrections are performed based on inaccurate measurement results.

For solving the problem, it is also considerable that a specific pattern such as a reference line indicating a correct measurement starting position of the sensor is added to the correcting image to correct the shift of the measurement timing of the sensor. However, in that case, a new pattern should be written in the correcting image, and toner for the writing of the pattern is additionally consumed. Consequently, the costs of the apparatus are increased.

SUMMARY OF THE INVENTION

It is an object of the present invention to provide an image forming apparatus and a gradation correction method, both capable of correcting the shift of measurement timing of a sensor easily and correctly.

In order to accomplish the above-mentioned object, according to a first aspect of the present invention, an image forming apparatus comprises:

an image forming unit for forming a correcting image for correcting gradations of an output image, on a bearing body;

a sensor for measuring reflected light quantity of the correcting image formed on the bearing body;

a gradation correcting unit for correcting the gradations of the output image, based on a measurement result of the measured reflected light quantity of the correcting image; and a timing correcting unit for detecting a shift of measurement timing, based on the measurement result by the sensor, and for correcting the detected shift of the measurement timing.

In accordance with the first aspect of the present invention, the shift of the measurement timing is detected based on the measurement result by the sensor, and is corrected. Consequently, even if the shift is generated in the measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

Preferably, the correcting image comprises a gradation pattern comprising a plurality of gradations;

the sensor measures the reflected light quantities of the correcting image at fixed interval timing; and the timing correcting unit detects a shift between specified timing prescribed in advance as timing at which a measurement of a head part of the gradation pattern is started, and timing at which a measured value having a largest change of the measured light quantity value in a vicinity of the specified timing is measured, as the shift of the measurement timing, based on the measured values measured at the fixed interval timing.

In accordance with the present invention, the shift between the specified timing, and the timing at which the measured value having the largest change of the measured light quantity value measured in the vicinity of the specified timing is measured, is detected as the shift of the measurement timing. Then, the measurement timing is corrected by the detected shift quantity. Consequently, even if the shift is generated in the measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

Preferably, the correcting image comprises a gradation pattern comprising a plurality of gradations;

the sensor measures the reflected light quantities of the correcting image at fixed interval timing; and the timing correcting unit detects the shift between specified timing prescribed in advance as timing at which a measurement of a head part of the gradation pattern is started, and timing at which a measured value near to an intermediate light quantity value of the measured values in a vicinity of the specified timing is measured, as the shift of the measurement timing, based on the measured values measured at the fixed interval timing.

In accordance with the present invention, the shift between the specified timing, and the timing at which the measured value near to the intermediate light quantity value of the light quantity value measured in the vicinity of the specified timing is measured, is detected as the shift of the measurement timing. Then, the measurement timing is corrected by the detected shift quantity. Consequently, even if the shift is generated in the measurement timing owing to the deterioration and the like of apparatus characteristics and apparatus members, the shift of the measurement timing can be easily and accurately corrected. Moreover, at the time of detecting the shift, the shift between the specified timing, and the timing at which the measured value near to the intermediate light quantity value is measured, is detected. Consequently, even if measurement noises are generated in a measurement result, the shift correction can be accurately performed without being influenced by the measurement noises. Moreover, because it is unnecessary to provide any specific patterns for detecting the measurement timing in the correcting image, the costs of materials can be reduced.

Preferably, the timing correcting unit corrects the measurement timing of the sensor by the shift quantity of the detected measurement timing.

In accordance with the present invention, at the time of the correction of the measurement timing, the measurement timing of the sensor is directly corrected. Consequently, the timing correction can be performed at real time.

Preferably, the timing correcting unit corrects the shift of the measurement timing by selecting the measured value to be applied as an output density value of each gradation in the gradation pattern among the respective measured values measured by the sensor according to the detected shift quantity of the measurement timing; and the gradation correcting unit performs the gradation correction based on the measured value selected as the output density value of each gradation.

In accordance with the present invention, at the correction of the measurement timing, the timing correction is performed by selecting the measured value to be applied as the output density value of each gradation in the gradation pattern among the respective measured values, according to the shift quantity of the measurement timing. Consequently, measured value selections at the time of both of the timing correction and the gradation correction can be simultaneously performed, and the shortening of the processing time at the time of the gradation correction can be achieved.

Preferably, the correcting image comprises a gradation pattern comprising a plurality of gradations; and the timing correcting unit detects the respective shift of the measurement timing from the plurality of gradation patterns, and performs the correction of the measurement timing by applying the shift quantities of the measurement timing, which are detected in the respective gradation patterns, to each of the gradation patterns.

In accordance with the present invention, the timing correction is performed by applying the shift quantities of the measurement timing, which are detected in the respective gradation patterns, to each of the gradation patterns. Consequently, partial shifts of the measurement timing can be also dealt with.

Preferably, the correcting image comprises a gradation pattern comprising a plurality of gradations; and the timing correcting unit detects the respective shift of the measurement timing from the plurality of gradation patterns, and corrects the shift of the measurement timing by applying an average value of the shift quantities, which are detected in the respective gradation patterns, to all of the gradation patterns, as a common shift quantity.

In accordance with the present invention, the timing correction is performed by applying the average value of the shift quantities, which are detected in the respective gradation patterns, to all of the gradation patterns. Consequently, detection errors of the shift quantities can be reduced, and thereby stabler timing corrections can be performed.

Preferably, the plurality of gradation patterns are all same gradation patterns.

In accordance with the present invention, the correcting image has the same gradation patterns. Consequently, by obtaining the average of the measured values of the light quantities in the respective gradation patterns, it is possible to average the output density values to the input density values of the respective gradation patterns. Thereby, stabler gradation corrections can be performed.

Preferably, the plurality of gradation patterns are different from one another.

In accordance with the present invention, the correcting image has the plurality of gradation patterns different from one another. Consequently, the output density values to many input density values can be measured. Hence, the correction accuracy of the gradation correction is improved.

Preferably, each gradation of the gradation pattern is formed in order that the measurement by the sensor is performed in an order from a high density gradation to a low density gradation.

In accordance with the present invention, measurement accuracy by the sensor can be improved.

Preferably, the correcting image comprises a plurality of colors;

the gradation correcting unit performs the gradation correction of each color based on the measured value of the reflected light quantity of the correcting image comprising the plurality of colors; and the timing correcting unit corrects the shift of the measurement timing every measurement of the reflected light quantity of the correcting image of each color.

In accordance with the present invention, the shifts of the measurement timing can be corrected even when gradation corrections are performed to the plurality of colors.

Preferably, the bearing body is a transfer member; and the sensor measures the reflected light quantity of the correcting image formed on the transfer member.

In accordance with the present invention, the reflected light quantities of the correcting image on the transfer member is measured. Consequently, the gradation corrections in consideration of the density changes at the time of image formation and the transfer, can be performed. Thereby, the correction accuracy of the gradation corrections is further improved.

In accordance with a second aspect of the present invention, an image forming apparatus comprises:

an image forming unit for forming a correcting image, which is an image for correcting gradations of an output image and comprises a gradation pattern comprising a plurality of gradations, on a bearing body;

a sensor for measuring reflected light quantities of the correcting image formed on the bearing body at fixed interval timing;

a gradation correcting unit for correcting the gradations of the output image, based on measurement results of the measured reflected light quantities of the correcting image; and a timing correcting unit for detecting a shift between specified timing prescribed in advance as timing at which a measurement of a head part of the gradation pattern is started, and timing at which a measured value having a largest change of the measured light quantity value in a vicinity of the specified timing is measured, as the shift of the measurement timing, based on the measured values measured at the fixed interval timing, and for correcting the detected shift of the measurement timing.

In accordance with the second aspect of the present invention, the shift between the specified timing, and the timing at which the measured value having the largest change of the measured light quantity value measured in the vicinity of the specified timing is measured, is detected as the shift of the measurement timing. Then, the measurement timing is corrected by the detected shift quantity. Consequently, even if the shift is generated in the measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

In accordance with a third aspect of the present invention, an image forming apparatus comprises:

an image forming unit for forming a correcting image, which is an image for correcting gradations of an output image and comprises a gradation pattern comprising a plurality of gradations, on a bearing body;

a sensor for measuring reflected light quantities of the correcting image formed on the bearing body at fixed interval timing;

a gradation correcting unit for correcting the gradations of the output image, based on measurement results of the measured reflected light quantities of the correcting image; and a timing correcting unit for detecting a shift between specified timing prescribed in advance as timing at which a measurement of a head part of the gradation pattern is started, and timing at which a measured value near to an intermediate light quantity value of the measured values in a vicinity of the specified timing is measured, as the shift of the measurement timing, based on the measured values measured at the fixed interval timing, and for correcting the detected shift of the measurement timing.

In accordance with the third aspect of the present invention, the shift between the specified timing, and the timing at which the measured value near to the intermediate light quantity value of the light quantity value measured in the vicinity of the specified timing is measured, is detected as the shift of the measurement timing. Then, the measurement timing is corrected by the detected shift quantity. Consequently, even if the shift is generated in measurement timing owing to the deterioration and the like of apparatus characteristics and apparatus members, the shift of the measurement timing can be easily and accurately corrected. Moreover, at the time of detecting the shift, the shift between the specified timing, and the timing at which the measured value near to the intermediate light quantity value is measured, is detected. Consequently, even if measurement noises are generated in a measurement result, the shift correction can be accurately performed without being influenced by the measurement noises. Moreover, because it is unnecessary to provide any specific patterns for detecting the measurement timing in the correcting image, the costs of materials can be reduced.

In accordance with a fourth aspect of the present invention, the image forming apparatus, further comprises:

a bearing body on which an image to be detected is formed;

a sensor for performing a plurality of measurements at a prescribed interval, to a surface of the bearing body moving relatively; and a judging unit for judging which measurement result is a detection result of the image to be detected, which is formed on the surface of the bearing body, among the plurality of measurement results.

Preferably, the sensor is controlled to perform a plurality of times of the measurements at fixed time interval.

In accordance with the fourth aspect of the present invention, a plurality of the measurements are performed to the image to be detected at the prescribed interval. Then, it is judged which measurement result is the detection result of the image to be detected, which is formed on the surface of the bearing body, among the plurality of measurement results. Consequently, the image to be detected, which is formed on the bearing body, can be detected. Further, based on the judgment result, the detection can be performed by using only the measurement result judged as the measurement result of the image to be detected.

Preferably, the judging unit corrects measurement timing of the sensor based on a judgment result by the judging unit.

In accordance with the present invention, the measurement timing can be corrected based on the judgment result which is judged as the measurement result of the image to be detected. Consequently, even if the shift is generated in the measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

Preferably, the image to be detected is a gradation pattern comprising a plurality of gradation images different from one another.

In accordance with the present invention, the image to be detected has the gradation pattern comprising the plurality of gradation images different from one another. Therefore, in the case where the gradation correction is performed based on the measurement result of such image to be detected, the correction accuracy of the gradation corrections can be improved.

Preferably, the sensor performs a plurality of times of the measurements of reflected light quantities at the prescribed interval; and the judging unit detects a shift between specified timing prescribed in advance as timing at which a measurement of a head part of the gradation pattern is started, and timing at which a measured value having a largest change of measured light quantity value in a vicinity of the specified timing is measured, as the shift of the measurement timing, based on the plurality of measurement results by the sensor, and corrects the specified timing so as to remove the shift.

In accordance with the present invention, the shift between the specified timing, and the timing at which the measured value having the largest change of the measured light quantity value measured in the vicinity of the specified timing is measured, is detected as the shift of the measurement timing. Then, the measurement timing is corrected by the detected shift quantity. Consequently, even if the shift is generated in measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

Preferably, the bearing body is any one of a photosensitive body, a transfer member onto which a toner image on the photosensitive body is transferred, and a recording material on which an image is recorded.

In accordance with the present invention, the image to be detected is formed on any one of the photosensitive body, the transfer member, and the recording material. In the case where the measurement of the image to be detected, which is formed on the photosensitive body, is performed, the measurement is performed before the primary transfer and the secondary transfer. Therefore, the time until the measurement can be shortened. Moreover, in the case where the measurement of the image to be detected, which is formed on the recording material, is performed, the measurement is performed after the secondary transfer. Therefore, the correction in consideration of the density changes owing to the primary transfer and the secondary transfer can be performed. Hence, a highly precise gradation correction can be performed. Moreover, in the case where the measurement of the image to be detected, which is formed on the transfer member, is performed, density changes owing to the primary transfer can be considered. Further the consumption of the recording paper, the toner or the like necessary for the secondary transfer can be reduced.

Preferably, the image forming apparatus, further comprises:

a storage unit for storing the image to be detected;

an image forming main body unit for forming the image to be detected, which is stored in the storage unit, on the bearing body; and a gradation correcting unit for correcting gradations of an output image output from the image forming main body unit, based on a result of the measurement of the image to be detected by the sensor.

In accordance with the present invention, the gradation correction of the output image can be performed based on the measurement result of the image to be detected.

In accordance with a fifth aspect of the present invention, a gradation correction method comprises:

forming a correcting image for correcting gradations of an output image, on a bearing body;

measuring reflected light quantity of the correcting image formed on the bearing body by the sensor;

detecting a shift of measurement timing based on a measurement result by the sensor, and correcting the detected shift of the measurement timing; and correcting the gradations of the output image, based on a measured value of the reflected light quantity of the correcting image after the correcting of the measurement timing.

In accordance with the fifth aspect of the present invention, the shift of the measurement timing is detected based on the measurement result by the sensor, and is corrected. Consequently, even if the shift is generated in the measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

Preferably, the correcting image comprises a gradation pattern comprising a plurality of gradations;

the measuring is performed by measuring the reflected light quantities of the correcting image at fixed interval timing; and the detecting and the correcting of the shift is performed by detecting the shift between specified timing prescribed in advance as timing at which a measurement of a head part of the gradation pattern is started, and timing at which the measured value having a largest change of the measured light quantity value in a vicinity of the specified timing is measured, as the shift of the measurement timing, based on the measured values measured at the fixed interval timing.

In accordance with the present invention, the shift between the specified timing, and the timing at which the measured value having the largest change of the measured light quantity value measured in the vicinity of the specified timing is measured, is detected as the shift of the measurement timing. Then, the measurement timing is corrected by the detected shift quantity. Consequently, even if the shift is generated in the measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

Preferably, the correcting image comprises a gradation pattern comprising a plurality of gradations;

the measuring is performed by measuring the reflected light quantities of the correcting image at fixed interval timing; and the detecting and the correcting of the shift is performed by detecting the shift between specified timing prescribed in advance as timing at which a measurement of a head part of the gradation pattern is started, and timing at which the measured value near to an intermediate light quantity value of the measured values in a vicinity of the specified timing is measured, as the shift of the measurement timing, based on the measured values measured at the fixed interval timing.

In accordance with the present invention, the shift between the specified timing, and the timing at which the measured value near to the intermediate light quantity value of the light quantity value measured in the vicinity of the specified timing is measured, is detected as the shift of the measurement timing. Then, the measurement timing is corrected by the detected shift quantity. Consequently, even if the shift is generated in the measurement timing owing to the deterioration and the like of apparatus characteristics and apparatus members, the shift of the measurement timing can be easily and accurately corrected. Moreover, at the time of detecting the shift, the shift between the specified timing, and the timing at which the measured value near to the intermediate light quantity value is measured, is detected. Consequently, even if measurement noises are generated in the measurement result, the shift correction can be accurately performed without being influenced by the measurement noises. Moreover, because it is unnecessary to provide any specific patterns for detecting the measurement timing in the correcting image, the costs of materials can be reduced.

Preferably, the detecting and the correcting of the shift is performed by correcting the measurement timing of the sensor by the shift quantity of the detected measurement timing.

In accordance with the present invention, at the time of the correction of the measurement timing, the measurement timing of the sensor is directly corrected. Consequently, the timing correction can be performed at real time.

Preferably, the detecting and the correcting of the shift is performed by correcting the shift of the measurement timing by selecting the measured value to be applied as an output density value of each gradation in the gradation pattern among the respective measured values measured by the sensor according to the detected shift quantity of the measurement timing; and the correcting of the gradations is performed by performing the gradation correction based on the measured value selected as the output density value of each gradation.

In accordance with the present invention, at the correction of the measurement timing, the timing correction is performed by selecting the measured value to be applied as the output density value of each gradation among each measured value of light quantity according to the shift quantity of the measurement timing. Consequently, measured value selections at the time of both of a timing correction and a gradation correction can be simultaneously performed, and the shortening of the processing time at the time of the gradation correction can be achieved.

Preferably, the correcting image comprises a gradation pattern comprising a plurality of gradations; and the detecting and the correcting of the shift is performed by detecting the respective shift of the measurement timing from the plurality of gradation patterns, and by performing the correction of the measurement timing by applying the shift quantities of the measurement timing, which are detected in the respective gradation patterns, to each of the gradation patterns.

In accordance with the present invention, the correction of the measurement timing is performed by applying the shift quantities of the measurement timing, which are detected in the respective gradation patterns, to each of the gradation patterns. Consequently, partial shifts of the measurement timing can be also dealt with.

Preferably, the correcting image comprises a gradation pattern comprising a plurality of gradations; and the detecting and the correcting of the shift is performed by detecting the respective shift of the measurement timing from the plurality of gradation patterns, and by correcting the sift of the measurement timing by applying an average value of the shift quantities, which are detected in the respective gradation patterns, to all of the gradation patterns, as a common shift quantity.

In accordance with the present invention, the timing correction is performed by applying the average value of the shift quantities, which are detected in the respective gradation patterns, to all of the gradation patterns. Consequently, detection errors of the shift quantities can be reduced, and thereby stabler timing corrections can be performed.

Preferably, the plurality of gradation patterns are all same gradation patterns.

In accordance with the present invention, the correcting image has the same gradation patterns. Consequently, by obtaining the average of the measured values of the light quantities in the respective gradation patterns, it is possible to average the output density values to the input density values of the respective gradation patterns. Thereby, stabler gradation corrections can be performed.

Preferably, the plurality of gradation patterns are different from one another.

In accordance with the present invention, the correcting image has the plurality of gradation patterns different from one another. Consequently, the output density values to many input density values can be measured. Hence, the correction accuracy of the gradation correction is improved.

Preferably, each gradation of the gradation pattern is formed in order that the measurement by the sensor is performed in an order from a high density gradation to a low density gradation.

In accordance with the present invention, measurement accuracy by the sensor can be improved.

Preferably, the correcting image comprises a plurality of colors;

the detecting and the correcting of the shift is performed by correcting the shift of the measurement timing every measurement of the reflected light quantity of the correcting image of each color; and the correcting of the gradations is performed by performing the gradation correction of each color based on the measured value of the reflected light quantity of the correcting image comprising the plurality of colors.

In accordance with the present invention, the shifts of the measurement timing can be corrected even when gradation corrections are performed to the plurality of colors.

Preferably, the bearing body is a transfer member; and the measuring is performed by measuring the reflected light quantity of the correcting image formed on the transfer member.

In accordance with the present invention, the reflected light quantity of the correcting image on the transfer member is measured. Consequently, the gradation corrections in consideration of the density changes at the time of image formation and the transfer can be performed. Thereby, the correction accuracy of the gradation corrections is further improved.

In accordance with a sixth aspect of the present invention, a gradation correction method comprises:

forming a correcting image, which is an image for correcting gradations of an output image and comprises a gradation pattern comprising a plurality of gradations, on a bearing body;

measuring reflected light quantities of the correcting image formed on the bearing body, by a sensor at fixed interval timing;

detecting a shift between specified timing prescribed in advance as timing at which a measurement of a head part of the gradation pattern is started, and timing at which a measured value having a largest change of the measured light quantity value in a vicinity of the specified timing is measured, as the shift of the measurement timing, based on the measured values of the reflected light quantity measured at the fixed interval timing, and correcting the detected shift of the measurement timing; and correcting the gradations of the output image, based on the measured value of the reflected light quantity of the correcting image after the correcting of the measurement timing.

In accordance with the sixth aspect of the present invention, the shift between the specified timing, and the timing at which the measured value having the largest change of the measured light quantity value measured in the vicinity of the specified timing is measured, is detected as the shift of the measurement timing. Then, the measurement timing is corrected by the detected shift quantity. Consequently, even if the shift is generated in measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

In accordance with a seventh aspect of the present invention, a gradation correction method comprises:

forming a correcting image, which is an image for correcting gradations of an output image, and comprises a gradation pattern comprising a plurality of gradations, on a bearing body;

measuring reflected light quantities of the correcting image formed on the bearing body by a sensor at fixed interval timing;

detecting a shift between specified timing prescribed in advance as timing at which a measurement of a head part of the gradation pattern is started, and timing at which a measured value near to an intermediate light quantity value of the measured values in a vicinity of the specified timing is measured, as the shift of the measurement timing, based on the measured values of the reflected light quantity measured at the fixed interval timing, and correcting the detected shift of the measurement timing; and correcting the gradations of the output image, based on the measured value of the reflected light quantity of the correcting image after the correcting of the measurement timing.

In accordance with the seventh aspect of the present invention, the shift between the specified timing, and the timing at which the measured value near to the intermediate light quantity value of the light quantity value measured in the vicinity of the specified timing is measured, is detected as the shift of the measurement timing. Then, the measurement timing is corrected by the detected shift quantity. Consequently, even if the shift is generated in measurement timing owing to the deterioration and the like of apparatus characteristics and apparatus members, the shift of the measurement timing can be easily and accurately corrected. Moreover, at the time of detecting the shift, the shift between the specified timing, and the timing at which the measured value near to the intermediate light quantity value is measured, is detected. Consequently, even if measurement noises are generated in the measurement result, the shift correction can be accurately performed without being influenced by the measurement noises. Moreover, because it is unnecessary to provide any specific patterns for detecting the measurement timing in the correcting image, the costs of materials can be reduced.

In accordance with an eighth aspect of the present invention, a control method of an image forming apparatus comprises:

forming an image to be detected, on a surface of a bearing body;

performing a plurality of measurements to the surface of the bearing body moving relatively, by a sensor at a predetermined interval; and judging which measurement result is a detection result of an image to be detected, which is formed on the surface of the bearing body, among the plurality of measurement results.

In accordance with the eighth aspect of the present invention, a plurality of the measurements are performed to the image to be detected at the prescribed interval. Then, it is judged which measurement result is the detection result of the image to be detected, which is formed on the surface of the bearing body, among the plurality of measurement results. Consequently, the image to be detected, which is formed on the bearing body, can be detected. Further, based on the judgment result, the detection can be performed by using only the measurement result judged as the measurement result of the image to be detected.

Preferably, the control method of the image forming apparatus, further comprises correcting measurement timing by the sensor, based on a judgment result in the judging.

In accordance with the present invention, the measurement timing can be corrected based on the judgment result which is judged as the measurement result of the image to be detected. Consequently, even if the shift is generated in the measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

Preferably, the image to be detected is a gradation pattern comprising a plurality of gradation images different from one another; and the performing of the plurality of measurements are performed by measuring reflected light quantities a plurality of times;

the control method further comprising, detecting a shift between specified timing prescribed in advance as timing at which a measurement of a head part of the gradation pattern is started, and timing at which a measured value having a largest change of a measured light quantity value in a vicinity of the specified timing is measured, as the shift of the measurement timing, based on the plurality of measurement results; and correcting the specified timing so as to remove the detected shift.

In accordance with the present invention, the shift between the specified timing, and the timing at which the measured value having the largest change of the measured light quantity value measured in the vicinity of the specified timing is measured, is detected as the shift of the measurement timing. Then, the measurement timing is corrected by the detected shift quantity. Consequently, even if the shift is generated in measurement timing owing to the deterioration and the like of apparatus characteristics and apparatus members, the shift of the measurement timing can be easily and accurately corrected. Moreover, because it is unnecessary to provide any specific patterns for detecting the measurement timing in the correcting image, the costs of materials can be reduced.

Preferably, the control method of the image forming apparatus, further comprises correcting gradations of an output image based on the measurement result of the image to be detected in the performing of the plurality of measurements.

In accordance with the present invention, the gradation correction of the output image can be performed based on the measurement result of the image to be detected.

BRIEF DESCRIPTION OF THE DRAWINGS

The present invention will become more fully understood from the detailed description given hereinafter and the accompanying drawing given by way of illustration only. However thus are not intended as a definition of the limits of the present invention. Wherein:

FIG. 4A is a view showing gradation patterns of a correcting image in which different input density values are set to respective gradation patterns even to the gradation patterns having the same density steps, FIG. 4B is a graph showing measured curves of the gradation patterns shown in FIG. 4A, FIG. 4C is a view showing gradation patterns of a correcting image in which the same input density values are set to respective gradation patterns having the same density steps, and FIG. 4D is a graph showing measured curves of the gradation patterns shown in FIG. 4C;

PREFERRED EMBODIMENTS OF THE INVENTION

In the following, the attached drawings will be referred to while the preferred embodiments of the present invention are described.

First Embodiment

In a first embodiment, a case where measurement timing of a sensor is corrected according to the following process will be described. That is, first, the measurement timing of a measured value before and after which measured values change in the largest scale is detected as the timing when the head part of a gradation pattern has been actually measured based on the measurement results of reflected light quantities of a correcting image with the sensor. Then, the difference between the detected timing and specified timing set in advance as the timing at which the head part should be measured is determined as a shift quantity of the measurement timing. Thereby, the measurement timing is corrected by the shift quantity.

First, the configuration of the first embodiment will be described.

Figure 1:
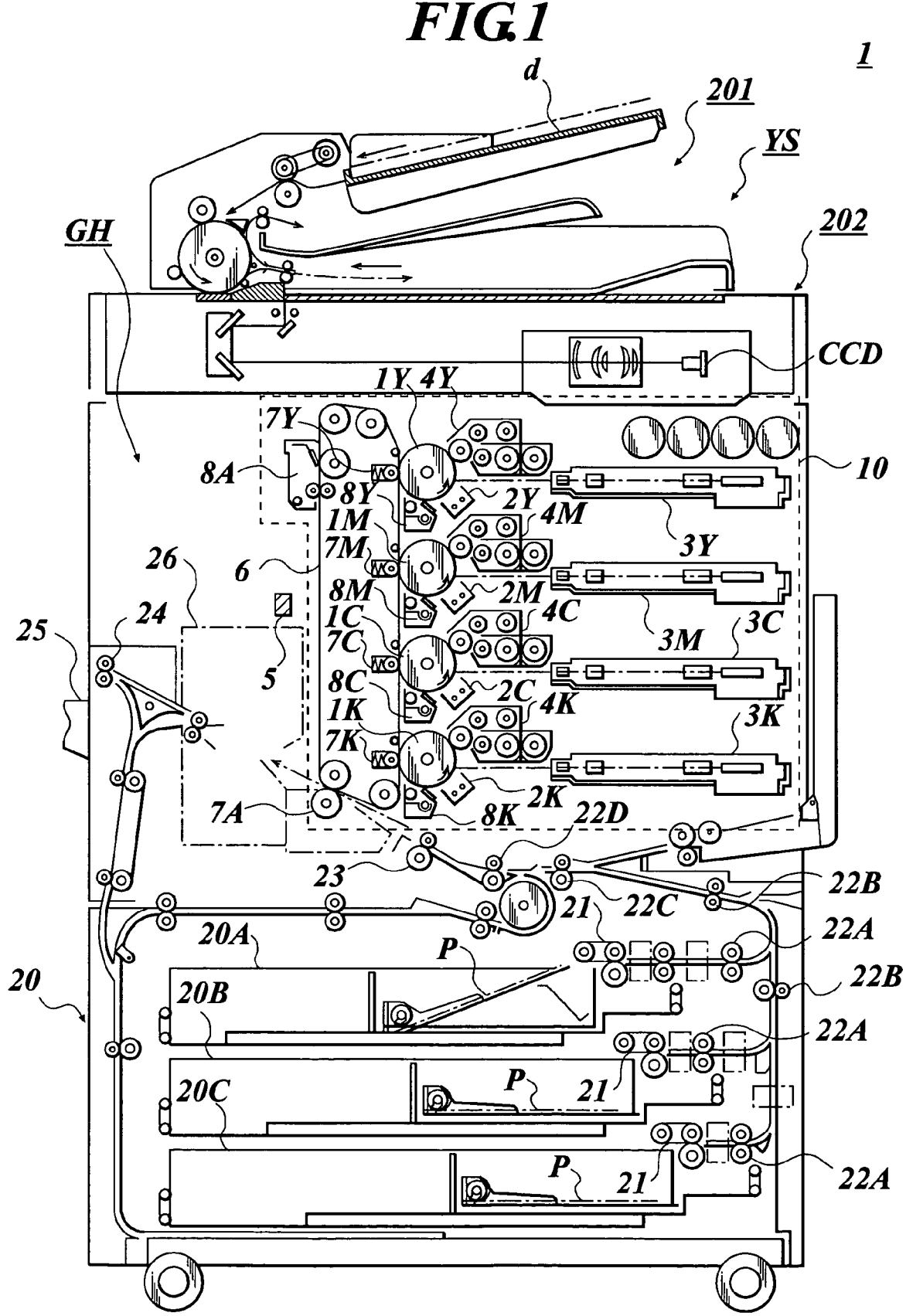
FIG. 1 is a sectional view showing an image forming apparatus of a first embodiment to which the present invention is applied.

FIG. 1 shows a configuration diagram of the cross section of an image forming apparatus 1 of the present embodiment.

As shown in FIG. 1, the image forming apparatus 1 is composed of an image forming main body unit GH and an image reading unit YS.

The image reading unit YS is disposed above the image forming main body unit GH. The image reading unit YS is composed of an automatic original feeding device 201 and an original image scanning and exposing device 202. The automatic original feeding device 201 feeds an original d placed on an original receiving tray with a feeding mechanism, and sends the fed original to the original image scanning and exposing device 202. The original image scanning and exposing device 202 exposes the fed original d by optical scanning, and converts the image of the original d photoelectrically with a line image sensor CCD. Thus, the image of the original is read.

The image of the original read by the image reading unit YS (analog image signal) is output to an image processing unit, which will be described later, and receives various kinds of image processing such as analog processing, analog-to-digital (A/D) conversion processing, shading processing and image compression processing by the image processing unit. After that, the colors constituting the image of the original is separated into respective colors of yellow (Y), magenta (M), cyan (C) and black (K), and the separated colors are output to an image forming unit 10 as exposing image data.

The image forming main body unit GH performs image formation based on a tandem system. The image forming main body unit GH is composed of the image forming unit 10 for forming images severally colored in one of Y, M, C and K, a paper supply unit 20 for supplying a sheet of recording paper P as a recording material, and a fixing unit 26 for fixing a toner image formed on the recording paper P.

The image forming unit 10 is composed of: exposure units 3Y, 3M, 3C and 3K for scanning exposure beams on photosensitive drums to form latent images of an image; development units 4Y, 4M, 4C and 4K for adhering toner to the photosensitive drums 1Y, 1M, 1C and 1K as photoreceptors; charging units 2Y, 2M, 2C and 2K, which are disposed around the respective photosensitive drums, for charging the photosensitive drums; cleaning units 8Y, 8M, 8C and 8K for removing the residual toner on the respective photosensitive drums; a transfer belt 6 being a transfer member on which the toner image formed on each of the photosensitive drums is primarily transferred, and a cleaning unit 8A for removing residual toner on the transfer belt. The transfer belt 6 is wound around a plurality of rollers, and supported in a state capable of turning.

The paper supply unit 20 is composed of paper supply cassettes 20A, 20B and 20C holding various sizes of recording paper P, and feeding mechanisms including sending rollers 21, paper supplying rollers 22A and the like severally. The paper supply unit 20 feeds a sheet of recording paper P having a designated size to the image forming unit 10.

The fixing unit 26 is composed of a fixing heater and the like. The fixing unit 26 performs the heat treatment of the recording paper P on which toner image has been transferred, and fixes the toner image on the recording paper P.

Each process of image formation by the image forming main body unit GH described above will be explained.

First, the exposure is performed by the exposure units 3Y, 3M, 3C and 3K, based on input exposing image data. Accordingly, latent images of images are formed on the photosensitive drums 1Y, 1M, 1C and 1K. Successively, the development of the formed latent images is performed by the development units 4Y, 4M, 4C and 4K. Accordingly, toner images are formed on the photosensitive drums 1Y, 1M, 1C and 1K. Incidentally, the development by the development units 4Y, 4M, 4C and 4K is performed by an inversion phenomenon produced by the application of a development bias formed by superposing an alternating voltage on a direct voltage having the same polarity as the polarity of used toner.

The toner images formed on the photosensitive drums 1Y, 1M, 1C and 1K are sequentially transferred onto the turning transfer belt 6 (the transfers are called as primary transfers) by primary transfer rollers 7Y, 7M, 7C and 7K, on which primary transfer biases having the opposite polarities of the used toner is applied. Consequently, a color image formed by synthesizing the toner images of respective colors is formed on the transfer belt 6.

On the other hand, a sheet of recording paper P is supplied from the paper supply unit 20, and is fed to a secondary transfer roller 7A through conveying rollers 22B, 22C and 22D, and resist roller 23. At the secondary transfer roller 7A, the color image formed on the transfer belt 6 is transferred on one surface of the recording paper P in a lump (the transfer is called as a secondary transfer). The recording paper P, on which the color image has been transferred, receives fixing processing by the fixing unit 26. Then the recording paper P is put between delivery rollers 24, and delivered onto a delivery tray 25 on the outside of the apparatus.

After a cycle of image formation has been completed thoroughly, toner which have not been transferred and remains on the photosensitive drums 1Y, 1M, 1C and 1K, and the peripheral surface of the transfer belt 6 after the transfers are removed by the cleaning units 8Y, 8M, 8C, 8K and 8A, respectively, and the apparatus 1 shifts to the next image formation cycle.

Next, a sensor disposed in the image forming unit 10 will be described.

As shown in FIG. 1, a sensor 5 for measuring the reflected light quantity of a toner image transferred primarily onto the transfer belt 6 by the photosensitive drums 1Y, 1M, 1C and 1K is disposed adjacently to the transfer belt 6. Incidentally, in the present embodiment, an example of measuring the reflected light quantity of an image formed on the transfer belt 6 with the sensor 5 will be described. However, the present invention may be applied to such configurations in which the reflected light quantities of the images formed on the photosensitive drums or on the recording paper are measured. In the case where the reflected light quantities of the images formed on the photosensitive drums are measured, the measurement is performed before the primary transfers and the secondary transfer, and consequently the time until the measurement can be shortened. In the case where the reflected light quantity of the image formed on the recording paper is measured, the measurement is performed after the secondary transfer, and consequently a correction in consideration of density changes owing to the primary transfers and the secondary transfer can be performed. Hence, a highly precise gradation correction can be performed. Moreover, in the case where the reflected light quantity of the image formed on the transfer belt 6 is measured, density changes owing to the primary transfers can be considered, and further the consumption of the recording paper, the toner or the like necessary for the secondary transfer can be reduced. Consequently, both of the shortening of the processing time necessary for the gradation correction and the heightening of the accuracy of the gradation correction can be achieved in a balanced manner, while the costs for the achievement is reduced. Hence, the present embodiment is preferable.

Figure 2:
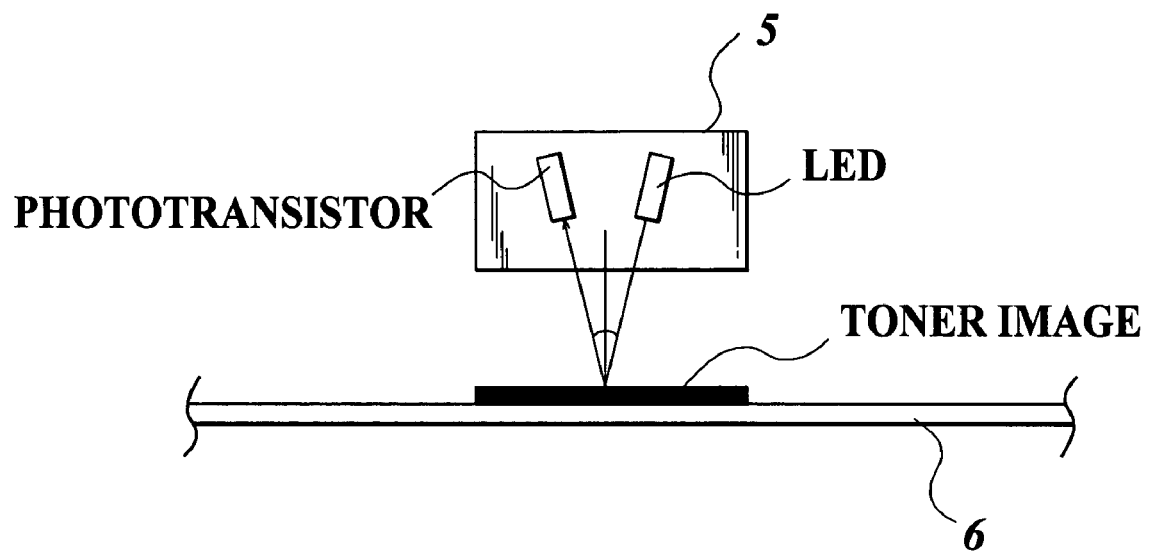
FIG. 2 is a view showing the internal configuration of a sensor.

As shown in FIG. 2, the sensor 5 is composed of a phototransistor and a LED (Light Emitting Diode) in the inside thereof. At a measurement, the LED emits light, and the emitted light is reflected by a toner image formed on the transfer belt 6 and enters the phototransistor. Then, a reflected light quantity (the expression of the reflected light quantity implies various measurement elements such as a reflectance and a light quantity) is measured by the phototransistor. A measurement result of the reflected light quantity is output to a timing correcting unit and a gradation correcting unit (which are described later) of the image forming apparatus 1. Then, after the measurement timing of the reflected light quantity has been corrected by the timing correcting unit, the logarithmic transformation of each measured value is performed by the gradation correcting unit, and the density value of each measured value is calculated. The density value is used for an output gradation correction as a measurement result of an output density value of a correcting image. Incidentally, a logarithmic transformation circuit may be provided in the sensor 5 to perform the logarithmic transformation of the measured value of reflected light quantity in the sensor 5, and thereby the obtained density value may be output to the timing correcting unit as the measurement result.

Figure 3:
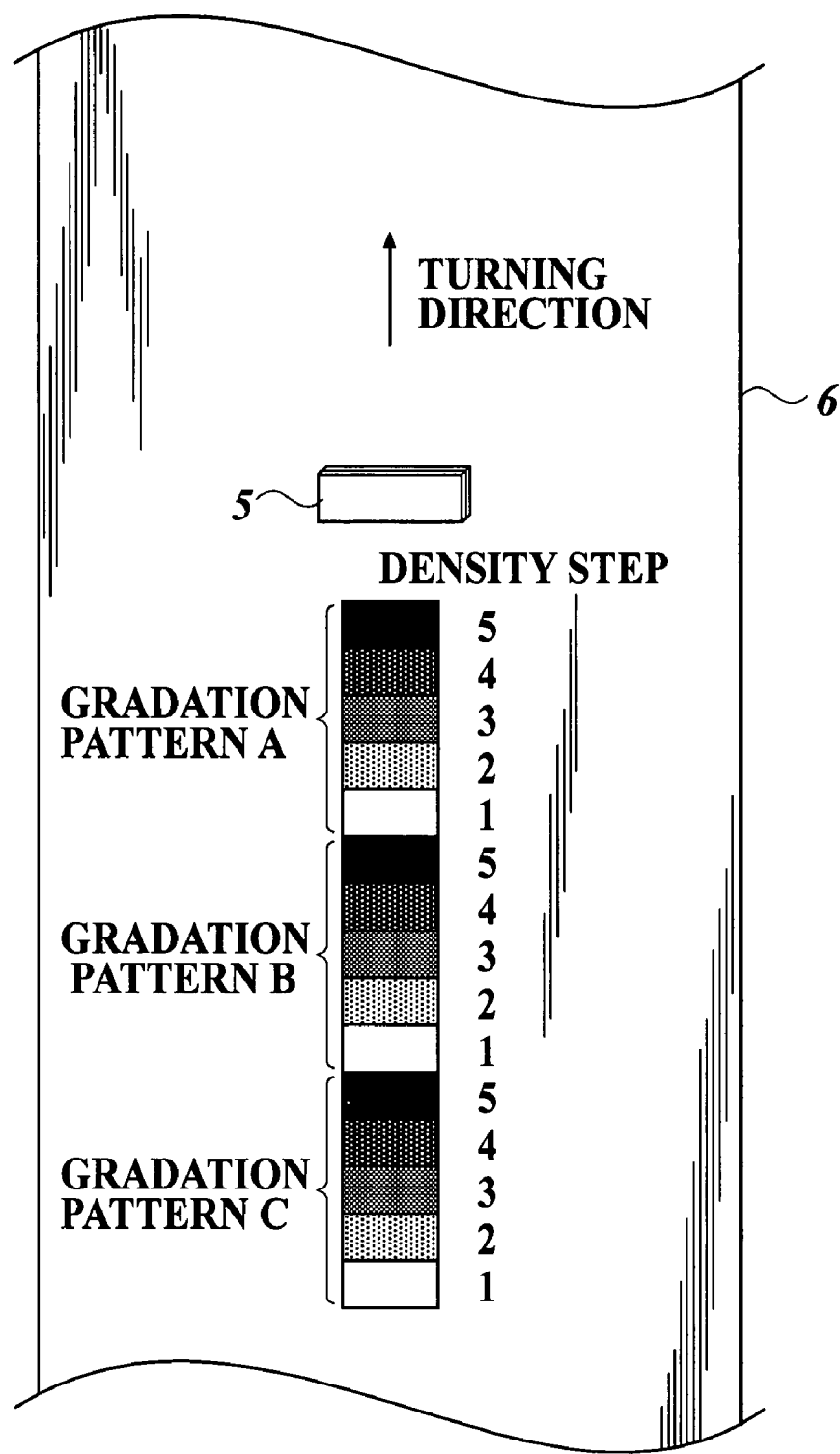
FIG. 3 is a view showing a transfer belt on which a correcting image is formed, and a sensor for measuring the reflected light quantities from the correcting image.

FIG. 3 shows the sensor 5 and the transfer belt 6, on which a correcting image is formed. An arrow in the figure shows the turning direction of the transfer belt 6.

As shown in FIG. 3, the correcting image includes continuously formed three gradation patterns A, B and C in total, each composed of five gradations of density steps 1 to 5. Each of the density steps is formed as a patch of a fixed size. The density steps are arranged so as to be measured in order, from the highest density to the lowest density. The disposition order aims to improve the measurement accuracy of the sensor 5.

Incidentally, a measurement start time period, which is from the point of time when the correcting image is formed on the transfer belt to the point of time when the sensor 5 start a measurement, is previously calculated and set, based on the turning speed of the transfer belt and the distance from the position where the correcting image is formed on the transfer belt to the measurement position of the sensor 5. When the measurement start time period has elapsed from the point of time of the image formation, the sensor 5 starts a measurement, and performs measurements of reflected light quantities at the timing of fixed intervals after the start of the measurement.

Moreover, the timing at which the head part of each of the gradation patterns is fed to the measurement position of the sensor 5, namely the timing at which the measurement of the head part of each of the gradation patterns is started, is calculated and set as specified timing in advance, based on the turning speed of the transfer belt 6 and the formation position of each of the gradation patterns on the transfer belt 6. Because the patch sizes of the density steps in the gradation patterns are known, the measured value to be applied as the output density value of each of the density steps is selected to be determined based on the measured values measured at the timing of the fixed intervals at the time of a gradation correction, and a measured curve is thereby calculated.

For example, in the case where the patch size of each of the density steps is 25 mm and the sensor 5 performs a measurement at the measurement timing of the interval of 5 mm, five measured values are obtained in one density step. Consequently, an arbitrary measured value may be selected as the output density value of each of the density steps every five measured values among the values measured at and after the specified timing by setting the specified timing as a reference. For example, in case of the output density value of the density step 4, an arbitrary measured value may be selected as the output density value of the density step 4 among the values measured at sixth to tenth order after the specified timing.

Incidentally, as shown in FIG. 4A, the gradation patterns, which have different input density values even to the same density steps of the respective gradation patterns, may be applied as the gradation patterns of the correcting image. In the case where measured curves A, B and C of the respective gradation patterns shown in FIG. 4A are calculated when gradation correction curves are calculated, the output density values to a great many input density values can be measured, as shown in FIG. 4B. Consequently, the correction accuracy of a gradation correction is improved. Moreover, as shown in FIG. 4C, the same gradation patterns may be applied by unifying density values of the same density steps in each of the gradation steps. In this case, in the case where the measured curves A, B and C of the respective gradation patterns are calculated, the output density values of the gradation patterns to each of the input density values can be averaged, as shown in FIG. 4D. Consequently, stabler gradation corrections can be performed.

Moreover, the correcting image is composed of the plurality of gradation patterns in the present embodiment. However, the correcting image may be composed of only one gradation pattern, and may perform gradation corrections based on the gradation pattern. By this method, the correction accuracy is not improved. However, the consumption quantities of the toner to be used for corrections can be decreased, and the processing time necessary for the correction can be shortened.

Figure 5:
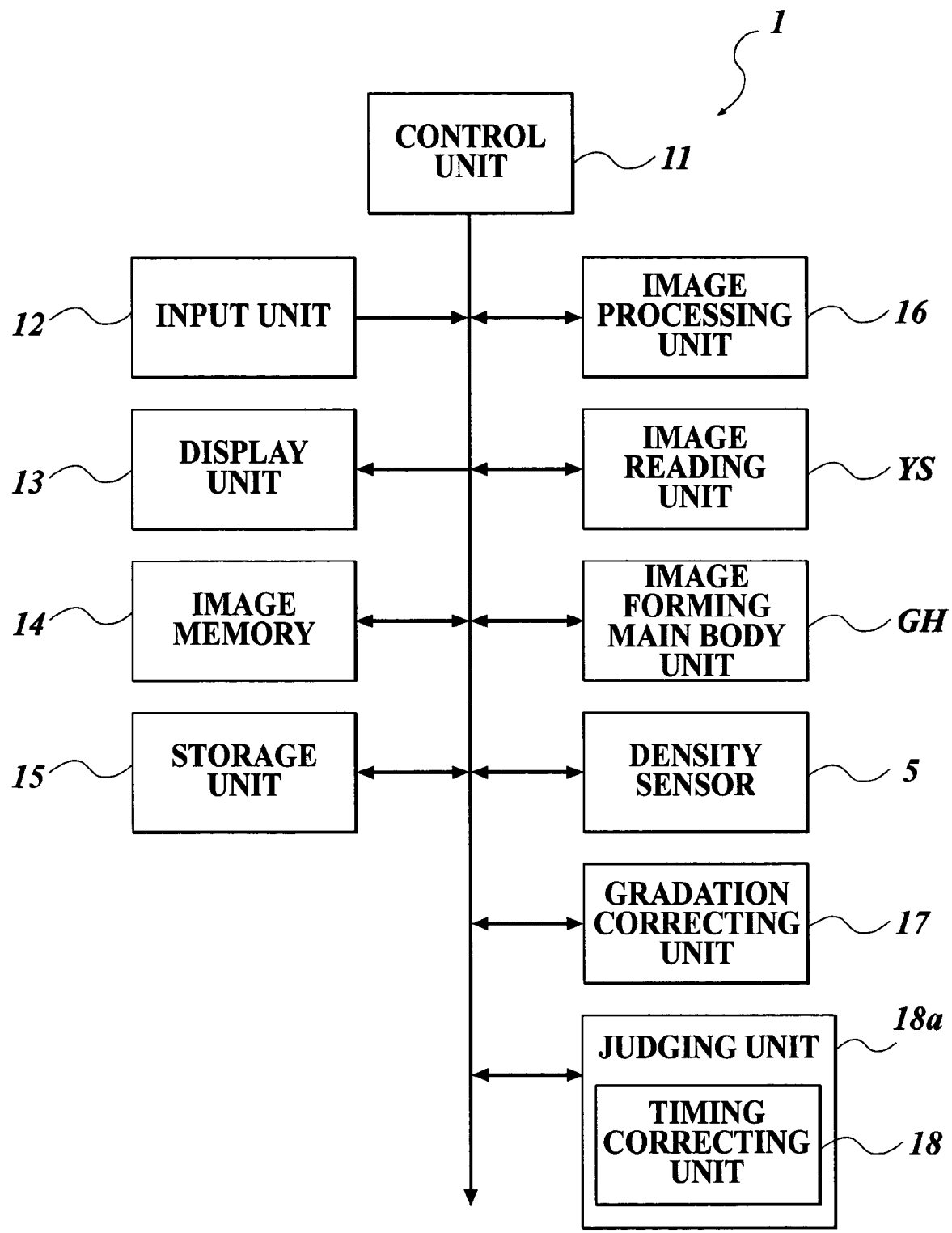
FIG. 5 is a block diagram showing the functional configuration of the image forming apparatus.

Next, FIG. 5 will be referred to while the functional configuration of the image forming apparatus 1 is described.

As shown in FIG. 5, the image forming apparatus 1 is composed of a control unit 11, an input unit 12, a display unit 13, an image memory 14, a storage unit 15, the image reading unit YS, the image forming main body unit GH, an image processing unit 16, the sensor 5, a gradation correcting unit 17 and a judging unit 18a including a timing correcting unit 18.

The control unit 11 is composed of a CPU (Central Processing Unit) and the like. The control unit 11 wholly controls the operation of each unit of the image reading unit YS, the image forming main body unit GH and the like, and performs image formation, according to an image formation program stored in the storage unit 15.

The input unit 12 is composed of numeral keys, various function keys, a touch panel formed with the display unit 13 integrally to one body, and the like. The input unit 12 outputs an operation signal corresponding to an operated key and an operation signal In accordance with an input operation on an operation screen displayed on the touch panel, to the control unit 11.

The display unit 13 is composed of a LCD (Liquid Crystal Display) or the like, and displays various operation screens and various kinds of display information such as processing results by the control unit 11.

The image memory 14 temporarily stores image data to be output such as the image data of an original image, which has been read by the image reading unit YS and has received an image processing by the image processing unit 16.

The storage unit 15 is composed of a magnetic or an optical recording medium, or a semiconductor memory. The storage unit 15 stores a gradation correction process program, a timing correction process program and data processed by various programs, in addition to a system program. Moreover, the storage unit 15 stores the image data of the correcting images prepared for the respective colors of Y, M, C and K.

The image processing unit 16 performs various kinds of image processing, such as analog processing, A/D conversion processing, shading processing and image compression processing, to the original image read by the image reading unit YS, and outputs the processed original image to the image memory 14.

The image reading unit YS, the image forming main body unit GH and the sensor 5 are the same as the image reading unit YS, the image forming main body unit GH and the sensor 5, respectively, described by the reference to FIG. 1. Accordingly, their descriptions are omitted.

That is, the image reading unit YS reads the image of an original on the original receiving tray, and outputs the read original image to the image processing unit 16.

Moreover, the image forming main body unit GH forms an image on a designated sheet of the recording paper P according to an instruction from the control unit 11 based on the image data of the original image stored in the image memory 14.

The sensor 5 emits light to the correcting image formed on the transfer belt 6, and measures the reflected light quantities of the light.

The gradation correcting unit 17 executes a gradation correction process (see FIG. 6) for correcting a change of an output density value of an output image to an input density value. At the time of the gradation correction process, the gradation correcting unit 17 instructs the image forming unit 10 to form the correcting image. When the correcting image is formed on the transfer belt 6, the gradation correcting unit 17 starts its clocking. When a predetermined measurement start time period has elapsed, the gradation correcting unit 17 instructs the sensor 5 to start measurement. When the measurement of the sensor 5 has been completed and measurement results of reflected light quantities are input, the gradation correcting unit 17 performs the logarithmic transformation of each of the measured values, and obtains the output density values of the correcting image. Incidentally, the example/of calculating the density values based on the measurement results of the reflected light quantities has been described. However, the method of obtaining the density values is not limited to the above-mentioned method. The density values may be obtained by calculating brightness or lightness based on the measurement results of the reflected light quantities.

Successively, measured curves, which indicate the output density values to the input density values of the correcting image, are calculated based on the output density values of the correcting image (the values obtained by performing the logarithmic transformation of the measured values of the reflected light quantities). Further gradation correction curves, which have inverse characteristics of the measured curves to an aimed gradation, are calculates. At the time of gradation conversions, the gradation corrections of the output image can be performed by converting the gradations of the output image by the use of the calculated gradation correction curves.

The judging unit 18*a* comprises the timing correction unit 18. The judging unit 18*a* judges which measurement result is a result of a measurement of the correcting image formed on the surface of the transfer belt 6, among a plurality of measurement results input from the sensor 5. Accordingly, based on the measurement result judged as the measurement result of the correcting image, the shift of measurement timing is corrected by the timing correction unit 18. At the time of the judging, among the measurement results of the reflected light quantities input from the sensor 5, the judging unit 18*a* detects the measured values having the largest change of the light quantity value in the vicinity of the specified timing prescribed in advance as the timing at which the measurements of the head part and the end part of the correcting image start. Then, the judging unit 18*a* judges that the measurement results between the detected measured value of the head part and the detected measured value of the end part is the results of the measurements of the correcting image.

The timing correcting unit 18 performs a timing correction process (see FIG. 9) for correcting the shift of measurement timing of the sensor 5 at the time of the gradation correction process. At the time of the correction of timing, among the measurement results of the reflected light quantities input from the sensor 5, the timing correcting unit 18 detects a measured value having the largest change of the light quantity value in the vicinity of the specified timing prescribe as the timing at which each of the measurements of the head parts of the gradation patterns in the correcting image starts. Then, the timing correcting unit 18 treats the measurement timing of the measured value as the timing at which each of the measurements of the head parts of the gradation patterns has actually started, and detects the shift quantity of the measurement timing from the specified timing. Then, the timing correcting unit 18 corrects the measurement timing of the sensor 5 by the detected shift quantity, and resolves the shift.

Next, FIGS. 6-9 will be referred to while the operation of the first embodiment is described.

Figure 6:
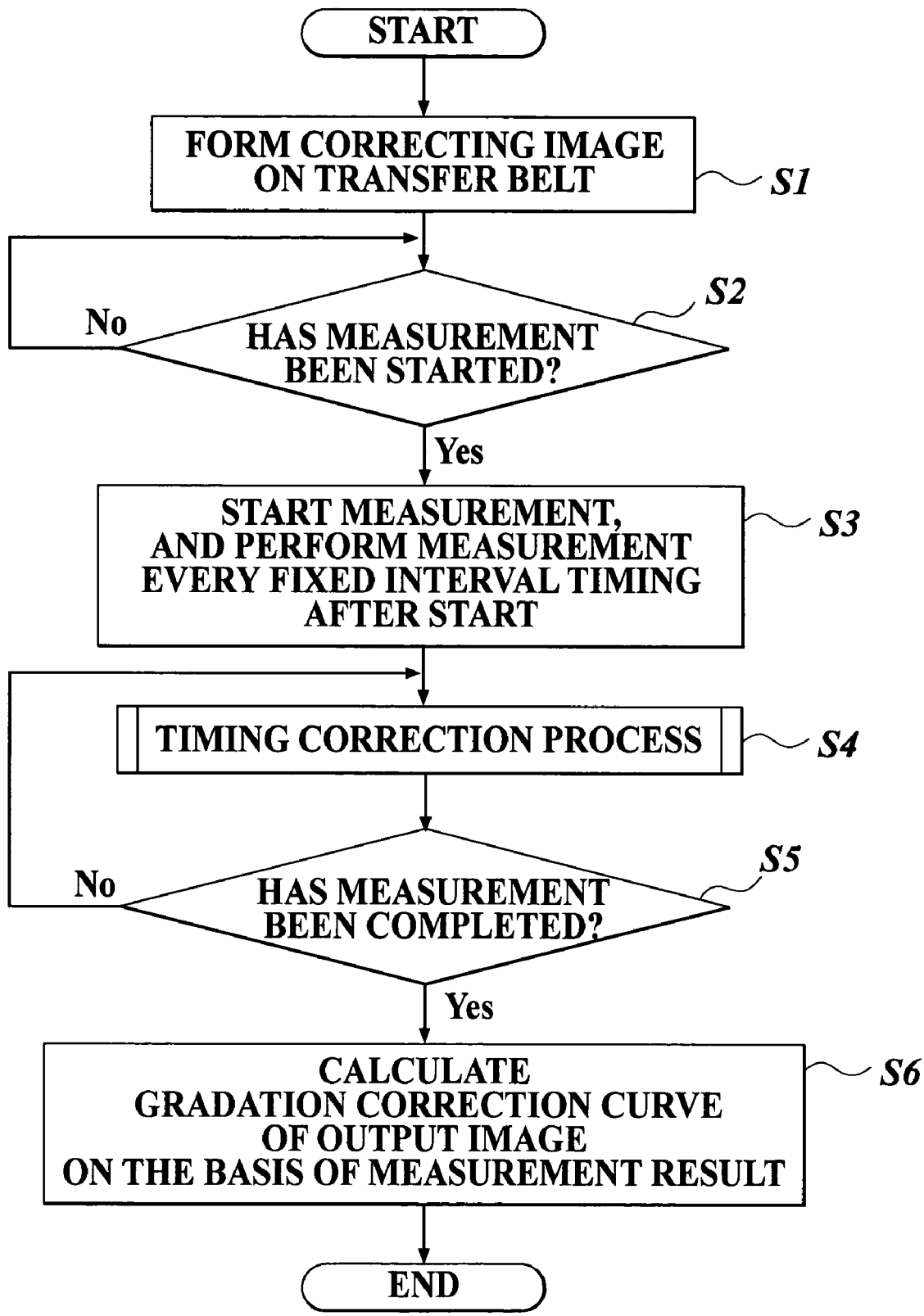
FIG. 6 is a flowchart for illustrating a first timing correction process executed by the image forming apparatus.

FIG. 6 is a flowchart for illustrating the gradation correction process executed by the image forming apparatus 1. The gradation correction process is a process for correcting the changes of the output density values to input density values. In the process, a measured curve is made out based on the measurement results of the reflected light quantities of the correcting image by the sensor 5, and a gradation correction curve is calculated based on the made out measured curve. The process is executed to each of the colors of Y, M, C and K. In the following description, the color of K will be exemplified to be described.

In the gradation correction process shown in FIG. 6, the correcting image of the color K is first read from the storage unit 15, and the image forming unit 10 forms a toner image of the correcting image on the photosensitive drum 1K based on the correcting image. Incidentally, the correcting image to be used here is set to include three sets of gradation patterns, which are severally composed of five gradation density steps as shown in FIG. 3. Then, the toner image formed on the photosensitive drum 1K is primarily transferred onto the transfer belt 6 (step S1).

When the toner image is transferred onto the transfer belt 6, clocking is started, and then it is judged whether or not the clocked time has reached the start timing of a measurement, which has been previously set (step S2). Then, when the clocked time has reached the start timing of the measurement (step S2; Y), the sensor 5 starts to measure reflected light quantities, and measures the reflected light quantities at fixed interval timing after the start of the measurements (step S3). Then, after the measurement has started, the process proceeds to the timing correction process at step S4.

Figure 7:
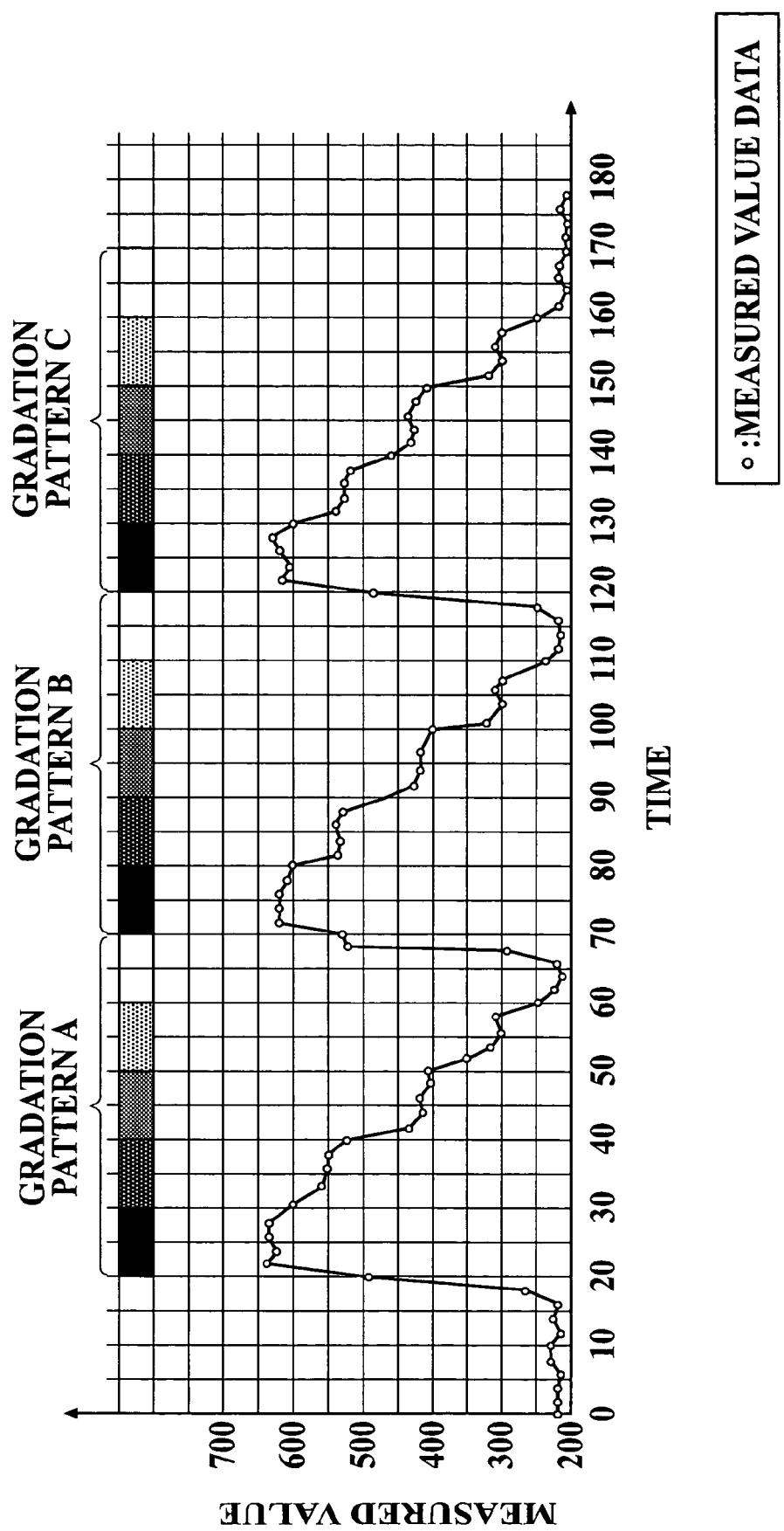
FIG. 7 is a time chart made by plotting measured values of light quantities of a correcting image measured by the sensor.
Figure 8:
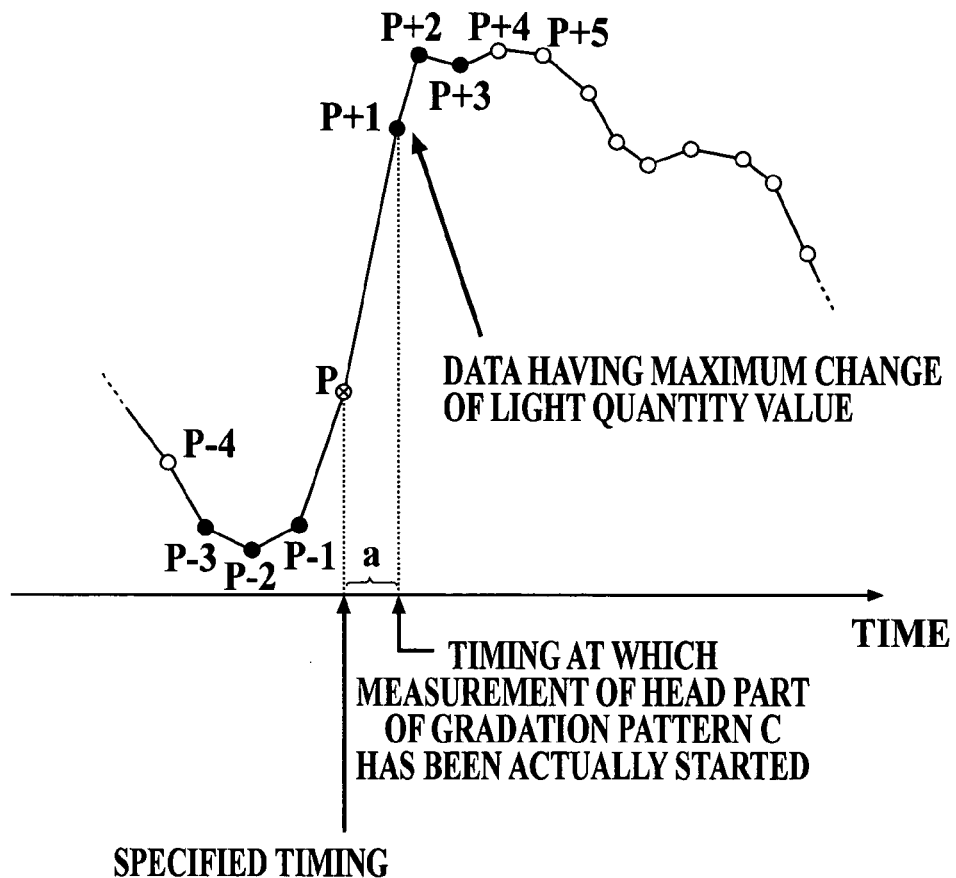
FIG. 8 is an enlarged view of the time chart of FIG. 7 at a boundary between gradation patterns B and C and its vicinities.

FIGS. 7 and 8 will be referred to while the timing correction process at the step S4 is described.

FIG. 7 is a time chart showing measurement results of reflected light quantities of the correcting image. In FIG. 7, the data of measured values (Y axis) by the sensor 5 is plotted to times (X axis) clocked from the point of time at which the measurement has been started. In the example shown in FIG. 7, the measurement is performed five times to each density step at fixed interval timing, and five pieces of the measured value data are plotted to each density step.

FIG. 8 shows an enlarged view of a boundary part at which the correcting image is switched from the gradation pattern B to the gradation pattern C in the time chart shown in FIG. 7. When a speed change is produced in the transfer belt 6, as shown in FIG. 8, the specified timing of the gradation pattern C has been shifted toward the gradation pattern B, and consequently an accurate measured value cannot be obtained. Moreover, as shown in FIG. 8, the density step moves from a density step of a low density to a density step of a high density at the head of the next gradation pattern, at the boundary part of each gradation pattern. Therefore, a remarkable change is produced in the measured values. That is, it is expected that, at the specified timing at which the measurement of the head part of each gradation pattern is actually started, the light quantity value drastically changes from the light quantity value of the measured value measured just before the specified timing.

In the following, the flowchart shown in FIG. 9 will be referred to while the timing correction process at the step S4 is described. The timing correction process is to correct the shift of a measurement timing by regarding the timing at which a measured value having the largest change of the light quantity value in the vicinity of the specified timing has been measured, as the timing at which the measurement of the head part of the gradation pattern has been actually started, namely as the originally specified timing.

Figure 9:
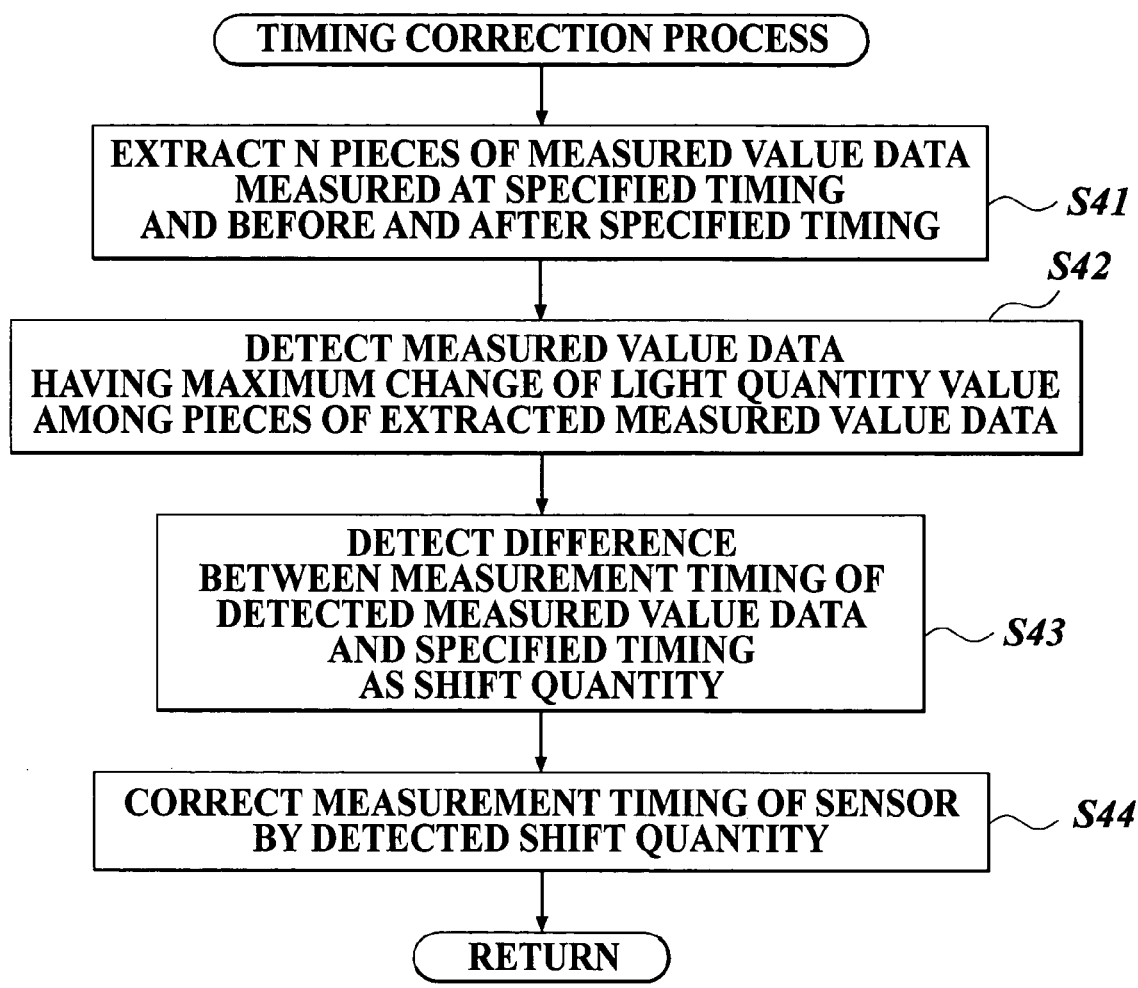
FIG. 9 is a flowchart for illustrating the operation of detecting a shift of measurement timing in the first timing correction process.

In the timing correction process shown in FIG. 9, first, among a plurality of measured value data, the measured value data obtained by measuring the correcting image are judged. Then, among the measured data judged as the measured data obtained by measuring the correcting image, the measured value data measured at the specified timing, and N pieces of measured value data measured severally before and after the specified timing, are extracted (step S41). For example, in the case where the number N=3, in the example shown in FIG. 8, in addition to the measured value data P measured at the specified timing, measured value data P−1, P−2, P−3, P+1, P+2 and P+3 measured respectively before and after the measured value data P measured at the specified timing are extracted. Incidentally, the number N is set as an integer smaller than the number of times of the measurements performed in one density step (N<5 in this example).

When the measured value data has been extracted, the measured value data having the largest change of the measured light quantity value among the extracted N+1 pieces of measured value data is detected (step S42). That is, the timing at which the measurement of the density step of the head of the gradation pattern C has been started is detected. In the example shown in FIG. 8, the measured value data P+1 measured at the next timing to the specified timing is detected as the data having the maximum change in the measured light quantity value.

Next, the difference between the measurement timing of the measured value data detected as the data having the maximum change of the measured light quantity value and the specified timing is detected as the shift quantity "a" of timing (step S43). Successively, the measurement timing of the sensor 5 is corrected by the detected shift quantity "a" (step S44), and the process proceeds to a step S5 of FIG. 6.

At the step S5 of FIG. 6, it is judged whether or not the measurement to the correcting image has been completed. When the measurements of all of the gradation patterns have not been completed (step S5; N), the process returns to the step S4, and the timing correction process to the next gradation pattern is performed.

Incidentally, the correction of the measurement timing may be performed in the way in which the shift quantity of the measurement timing detected at the head part of the first gradation pattern is applied to all of the following gradation patterns to correct the measurement timing of all of the gradation patterns by the same shift quantity for shortening the processing time necessary for the shift quantity calculation. Alternatively, for example, in the case where the shift quantity calculated in the gradation pattern B is designated by "b" and the shift quantity calculated in the gradation pattern C is designated by "c", the output density value of each density step in the gradation pattern B is selected In accordance with the shift quantity "b", and the output density value of each density step in the gradation pattern C is selected In accordance with the shift quantity "c". In such a way, the shift quantity may be calculated at the head part of each gradation pattern to correct the measurement timing by applying each of the calculated shift quantities to each of the gradation patterns. In this case, it is possible to deal with partial speed changes.

On the other hand, when the measurements have been completed to all of the gradation patterns (step S5; Y), output density values are calculated based on the measurement results, and a measured curve indicating output density values to input density values of each gradation pattern is calculated. Furthermore, gradation correction curves of the output image are calculated based on the measured curves (step S6), and then the gradation correction process is completed.

As described above, in the first embodiment, the densities of a correcting image including a plurality of gradation patterns are measured, and the timing, at which the measured values having the maximum change of measured light quantity value in the vicinity of the specified timing are measured based on the measurement results of the measured densities, is regarded as the timing at which the measurements of the head parts of the gradation patterns have been actually started. Then, the shift quantity between the measurement timing and the specified timing is detected, and the measurement timing of the sensor is corrected by the detected shift quantity. Consequently, the shifts of the measurement timing can be easily and accurately corrected. Moreover, because it is unnecessary to provide any specific pattern for detecting the measurement timing in a correcting image, gradation corrections can be performed without increasing any costs.

Moreover, at the point of time of the completion of the measurement of the head part of one gradation pattern, the measurement result is immediately analyzed and the shift quantity of the measurement timing is calculated to correct the measurement timing of the sensor. Therefore, the correction can be performed at real time.

Incidentally, the contents described with regard to the first embodiment is a preferable example of an image forming apparatus to which the present invention is applied, and the scope of the present invention is not limited to the contents.

In the above description, the measurement timing of the sensor 5 is corrected. However, the output density value of each density step may be selected from each measured value data In accordance with the shift of the detected measurement timing. In the example shown in FIG. 8, five pieces of data at and after the measured value data P+1, which have been detected as the head part of the gradation pattern, must be the data obtained by measuring the reflected light quantities in the step region of the density step 5. Accordingly, for example, the measured value data P+3 can be selected as the output density value of the density step 5. Moreover, a plurality of pieces of data, for example two pieces of data of the measured value data P+3 and P+4, may be selected, and the average value of the plurality of pieces of data may be applied as the output density value of the density step 5.

In addition, the detailed configurations and the detailed operation of the image forming apparatus 1 of the first embodiment may be also changed suitably without departing from the scope and the sprit of the present invention.

Second Embodiment

In a second embodiment, the following example will be described. In the example, the measurement timing of a measured value near to an intermediate light quantity value of the measured light quantity values in the vicinity of the specified timing is detected as the timing at which the head part of a gradation pattern is measured, at the time of a gradation correction. The difference between the detected timing of the head part and the specified timing is set as the shift quantity of the measurement timing. Output density values of each gradation pattern are selected In accordance with the shift quantity. Thereby, the shift of the measurement timing is corrected.

First, the configuration of an image forming apparatus of the second embodiment will be described. The configuration of the image forming apparatus of the second embodiment is the same as the configuration of the image forming apparatus 1 of the first embodiment. The same components of the second embodiment as those of the first embodiment are designated by the same reference numerals as those of the first embodiment, and the illustration of the same components is omitted. Only the functional parts different from those of the first embodiment will be described. That is, in the second embodiment, the image forming apparatus 1 is, as shown in FIGS. 1 and 5, composed of the control unit 11, the input unit 12, the display unit 13, the image memory 14, the storage unit 15, the image processing unit 16, the image reading unit YS, the image forming main body unit GH, the sensor 5, the gradation correcting unit 17 and the judging unit 18a including the timing correcting unit 18.

In the second embodiment, at the time of the gradation correction process (see FIG. 10), the gradation correcting unit 17 instructs the image forming unit 10 to form a correcting image. When the correcting image is formed on the transfer belt 6, the gradation correcting unit 17 starts clocking. When a predetermined measurement start time period has elapsed, the gradation correcting unit 17 instructs the sensor 5 to start a measurement.

When the measurement by the sensor 5 has been completed, the timing correcting unit 18 executes a timing correction process (see FIG. 12) for correcting a shift of the measurement timing by the sensor 5 based on the measurement results. First, the timing correcting unit 18 detects a measured value nearest to the intermediate light quantity value of the measured light quantity values in the vicinity of the specified timing prescribed in advance as the start timing of the measurement of the head part of a gradation pattern in the correcting image. The timing correcting unit 18 regards the measurement timing of the measured value as the timing at which the measurement of the head part of the gradation pattern has actually started, and detects the shift quantity between the measurement timing and the specified timing. Then, according to the detected shift quantity, the timing correcting unit 18 selects a measured value to be applied as the output density value of each gradation in the gradation pattern, among respective measured values measured at fixed interval timing.

The gradation correcting unit 17 performs the logarithmic transformation of the measured value of each gradation selected at the timing correction process, and calculates output density values. Then, the gradation correcting unit 17 calculates a measured curve showing output density values to input density values, and calculates a gradation correction curve having the inverse characteristic of the measured curve to an aimed gradation. At the time of a gradation conversion, a gradation correction of an output image can be performed by converting the gradations of the output image by means of the gradation correction curve.

Figure 10:
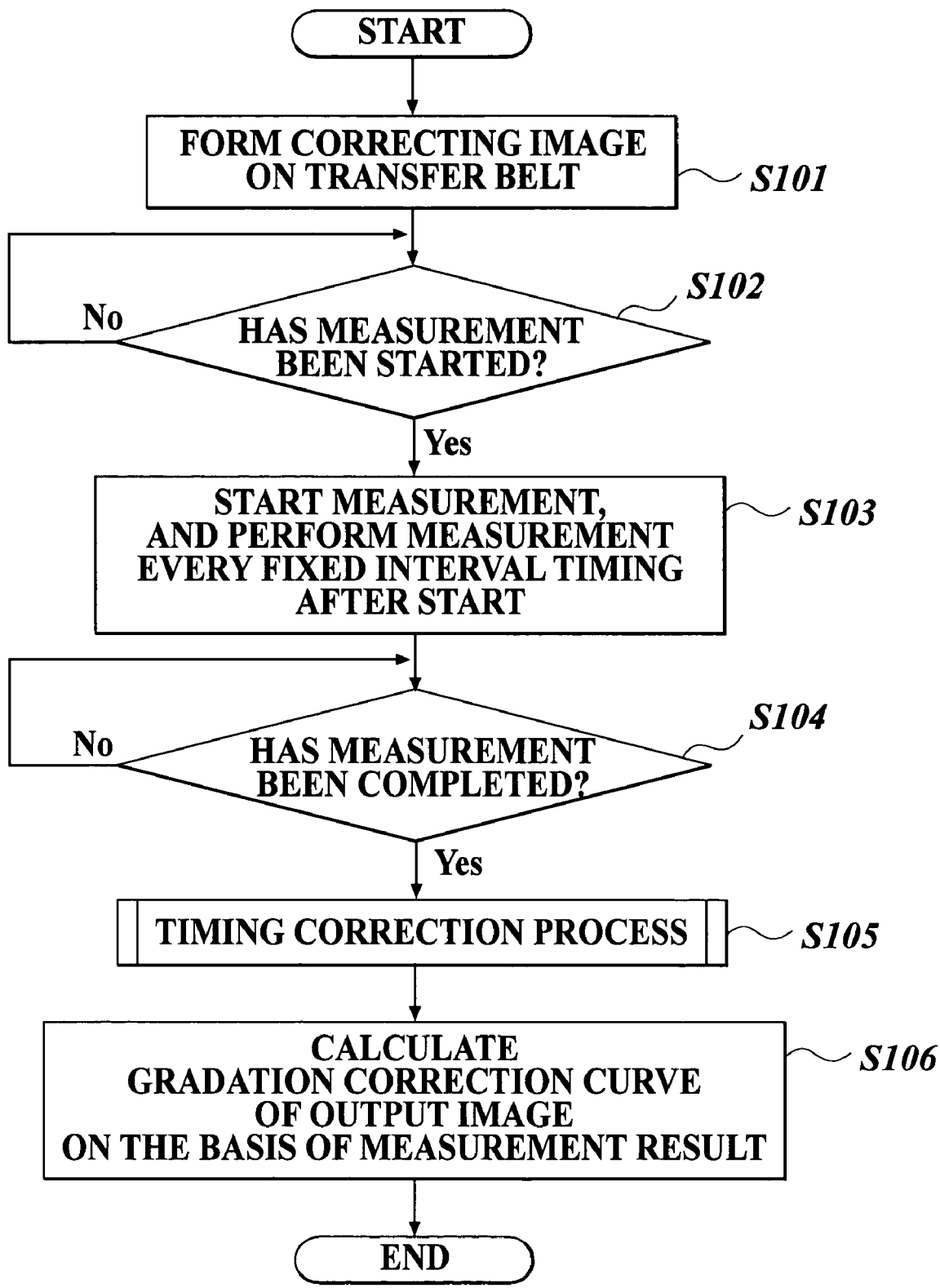
FIG. 10 is a flowchart for illustrating a second timing correction process executed by the image forming apparatus of a second embodiment.
Figure 11:
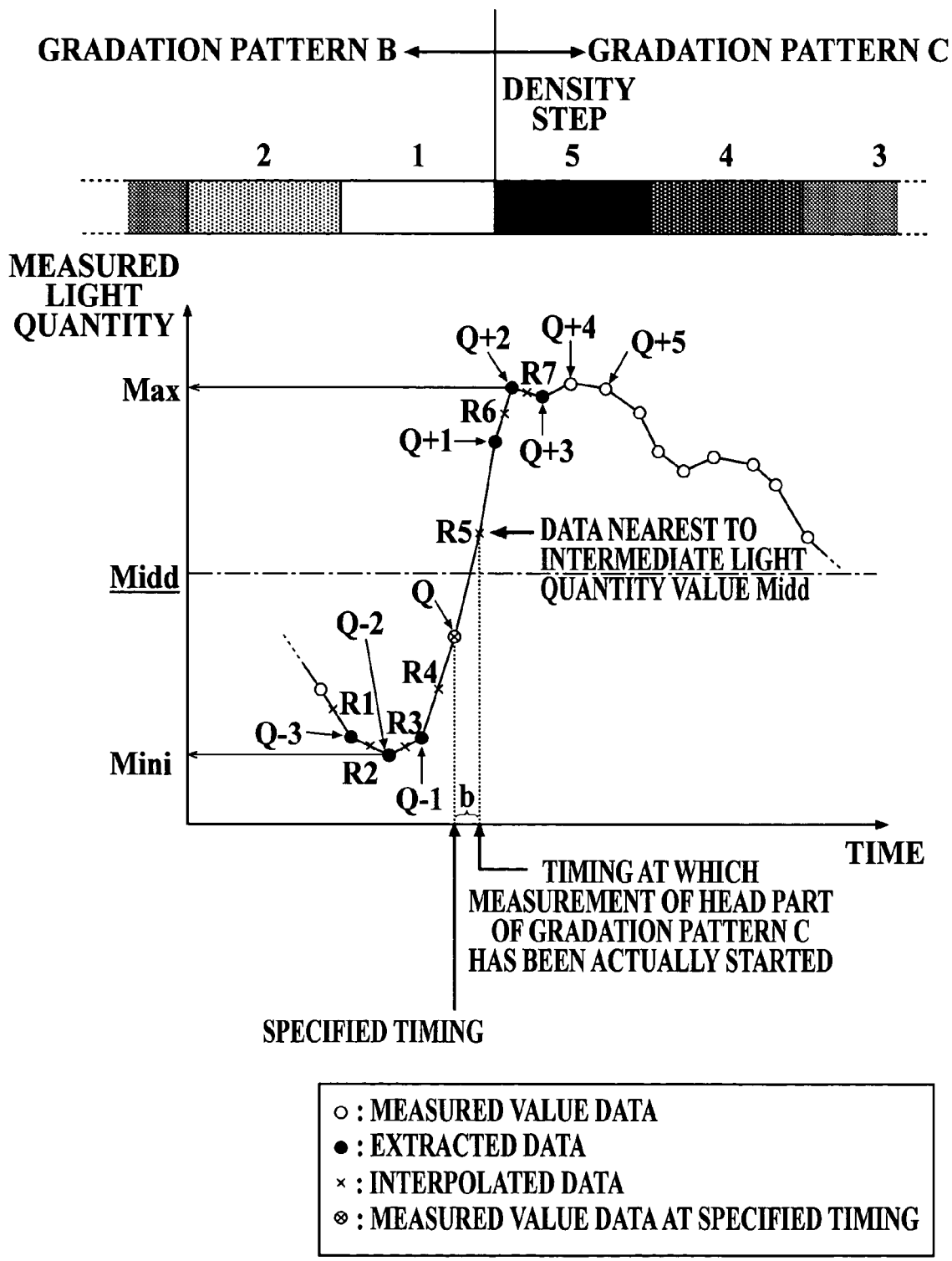
FIG. 11 is an enlarged view of a time chart at a boundary between gradation patterns B and C and its vicinities.
Figure 12:
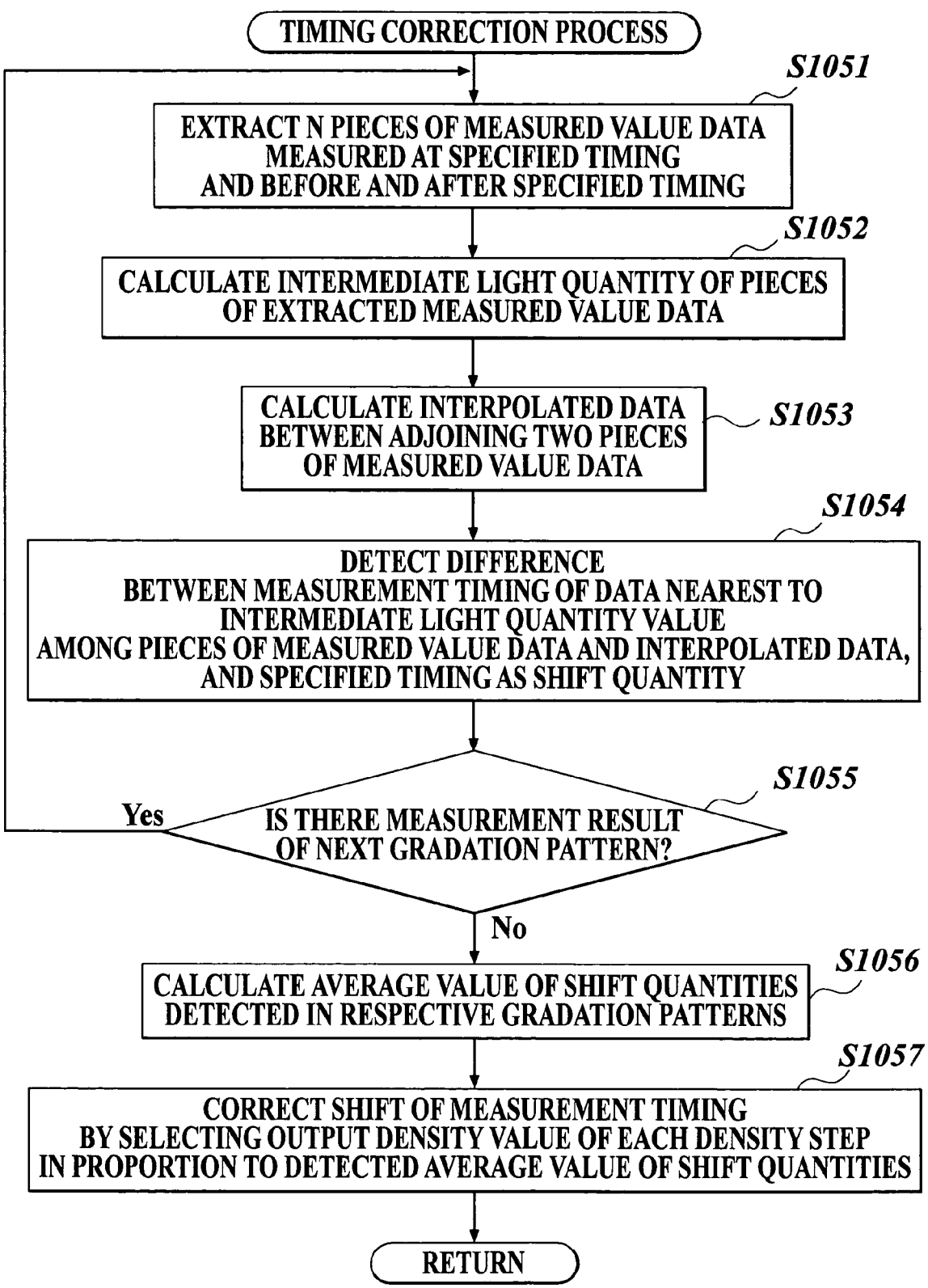
FIG. 12 is a flowchart for illustrating the operation of detecting a shift of measurement timing in the second timing correction process.
Figure 13:
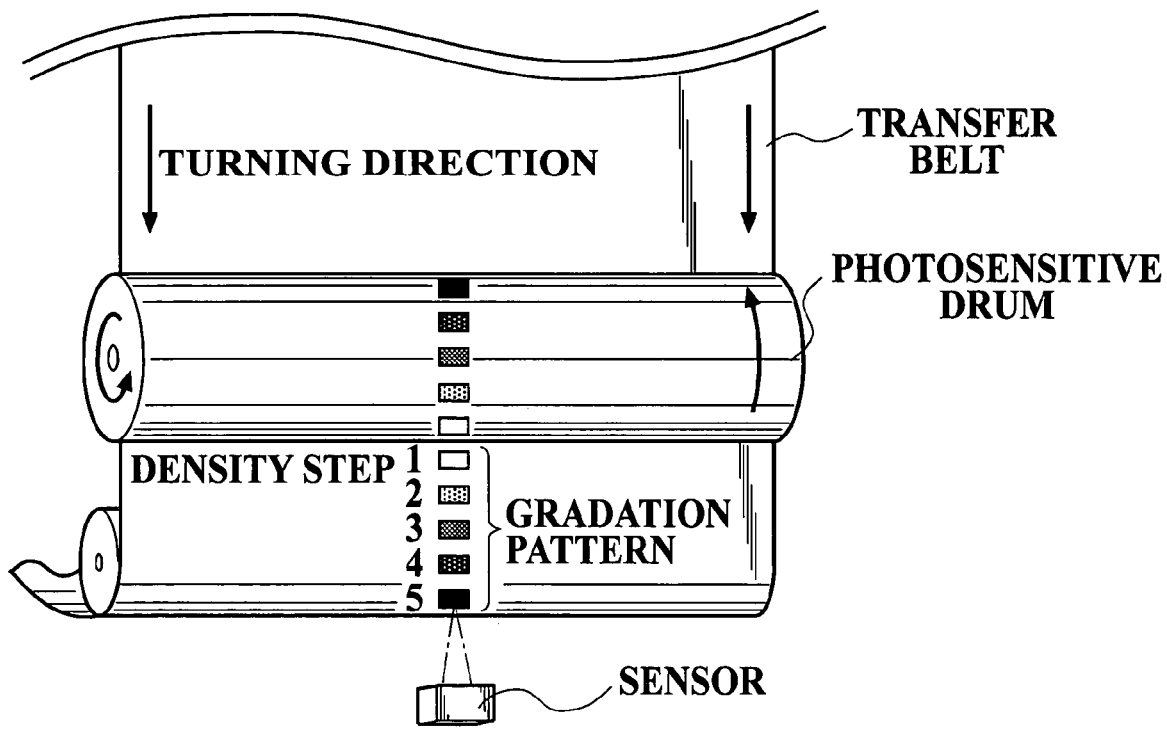
FIG. 13 is a view showing a sensor for performing the measurement of the reflected light quantities of a correcting image formed on a transfer belt at the time of a gradation correction in a conventional image forming apparatus.
Figure 14:
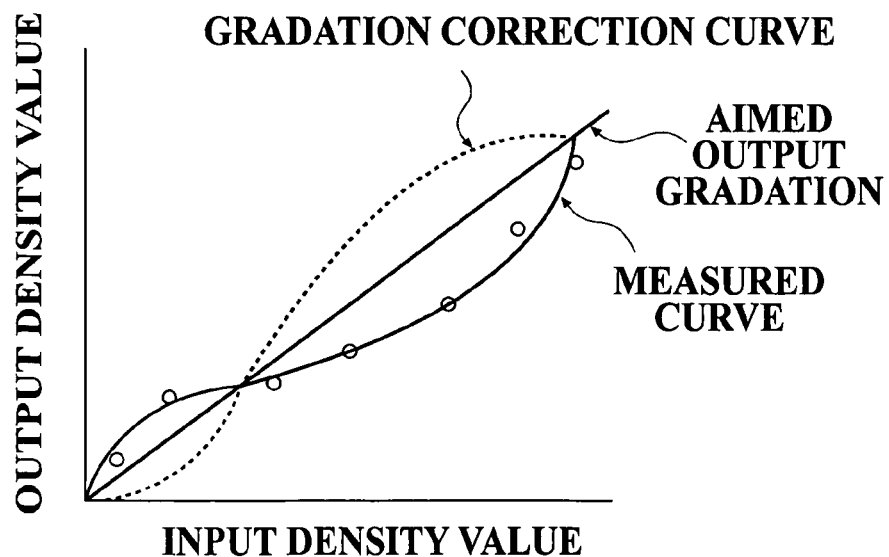
FIG. 14 is a graph showing an example of obtaining a correction curve based on a measured curve of output densities calculated from the measurement results of light quantities with the sensor.

Next, FIGS. 10 to 12 will be referred to while the operation of the second embodiment is described.

FIG. 10 is a flowchart for illustrating the gradation correction process of the second embodiment. The gradation correction process is a process for correcting the changes of the output density values to input density values, for making out a measured curve based on the measurement results of the reflected light quantities of a correcting image by the sensor 5, and for calculating a gradation correction curve based on the made out measured curve. The process is performed to each color of Y, M, C and K. In the following description, the color of K is exemplified to be described.

In the gradation correction process shown in FIG. 10, first, a correcting image of the color K is read from the storage unit 15, and a toner image of the correcting image is formed on the photosensitive drum 1K by the image forming unit 10 based on the read correcting image. Incidentally, the correcting image to be used here is set to be one including continuous three sets of gradation patterns, each having five gradations of density steps as shown in FIG. 3. Then, the toner image formed on the photosensitive drum 1K is primarily transferred onto the transfer belt 6 (step S101).

When the toner image has been transferred onto the transfer belt 6, clocking is started. It is judged whether or not a previously set start time period of a measurement has elapsed (step S102). When the start time period of the measurement has elapsed (step S102; Y), the measurement by the sensor 5 is started. After the start of the measurement, the sensor 5 performs the measurement of reflected light quantities of the correcting image at fixed interval timing (step S103).

After the start of the measurement, it is judged whether or not the measurement of the correcting image has been completed (step S104). When the measurement has been completed (step S104; Y), the process proceeds to the timing correction process at a step S105.

FIGS. 11 and 12 will be referred to while the timing correction process is described. Incidentally, it is supposed that the time chart shown in FIG. 7 has been obtained based on the measurement results of the reflected light quantities of the correcting image. FIG. 7 is the time chart showing the measurement results of the correcting image, and has been drawn by plotting the data of measured values (Y axis) by the sensor 5 to the time (X axis) clocked from the point of time when the measurement has been started.

FIG. 11 shows an enlarged view of the boundary part at which the correcting image is switched from the gradation pattern B to the gradation pattern C in the time chart shown in FIG. 7. When a speed change is produced in the transfer belt 6, the specified timing of the gradation pattern C has been shifted toward the gradation pattern B, as shown in FIG. 11. Consequently accurate output density values cannot be obtained.

Moreover, a remarkable change is produced in the measured values at the boundary part at which the density step moves from the density step at the tag end of the preceding gradation pattern to the density step at the head of the next gradation pattern at each gradation pattern. That is, it is expected that the measured value at the timing at which the measurement of the head part of the gradation pattern is actually started is an intermediate light quantity value between the measured value of a low light quantity of the previous gradation pattern and the measured value of a high light quantity of the next gradation pattern.

In the following, the flowchart shown in FIG. 12 will be referred to while the timing correction process is described. The timing correction process is to correct the shift of measurement timing by regarding the timing at which a measured value, which is near to an intermediate light quantity value between the measured value of the density step being a low density at the tag end of the former gradation pattern B and the measured value of the density step being a high density at the head of the latter gradation pattern C following the gradation pattern B, has been measured as the timing at which the measurement of the head part of the gradation pattern C has been actually started.

In the timing correction process shown in FIG. 12, first, among a plurality of measured value data, the measured value data obtained by measuring the correcting image are judged. Then, among the measured data judged as the measured data obtained by measuring the correcting image, a piece of measured data measured at the specified timing, and N pieces of measured value data measured severally before and after the specified timing, are extracted (step S1051). For example, in the case where the number N=3, in the example shown in FIG. 11, a piece of measured value data Q measured at the specified timing, and measured value data Q+1, Q+2, Q+3, Q−1, Q−2 and Q−3 (measured data indicated by black circles) measured after and before the specified timing, respectively, are extracted. Incidentally, the number N is set to be an integer smaller than the number of times of measurements performed to each density step (N<5 in the example).

Next, an intermediate light quantity value of the respective pieces of extracted measured value data is calculated (step S1052). First, the maximum value Max and the minimum value mini are obtained from each of the extracted measured value data. Then, the intermediate light quantity value Midd is calculated in conformity with the following formula (I).

$$Midd = (Max - mini)/2 + mini \qquad (1)$$

In the example shown in FIG. 11, the measured light quantity value of the measured value data Q+2 is the maximum value Max, and the measured light quantity value of the measured value data Q−2 is the minimum value mini.

Next, interpolated data for interpolating between respective pieces of measured value data is calculated for improving the correction accuracy of the timing correction (step S1053). The interpolated data is data of an intermediate measured light quantity value to be plotted at the intermediate measurement timing between adjacent measured value data (data R1 to R7 indicated by a mark x in FIG. 11). That is, medians between adjacent measured value data.

When the interpolated data have been calculated, the data nearest to the intermediate light quantity value Midd calculated at the step S1052, among the extracted measured value data and the interpolated data, is detected as the data obtained by measuring the head part of the gradation patterns actually. In the example shown in FIG. 11, interpolated data R5 between the data Q and the data Q+1 is detected as the data nearest to the intermediate light quantity value Midd. Then, the difference "b" between the measurement timing of the detected data R5 and the specified timing is detected as a shift quantity (step S1054)

When a shift quantity of measurement timing has been detected to one gradation pattern by such a method, it is judged whether or not measurement results of the next gradation pattern have been obtained (step S1055). When the measurement results of the next gradation pattern have been obtained (step S1055; Y), the process returns to the step S105, and the shift quantity of the measurement timing of the next gradation pattern is detected. On the other hand, when shift quantities of measuring timing have been detected to all of the gradation patterns and the measuring results of the next gradation pattern have not been obtained (step S1055; N), an average value of shift quantities of the measuring timing calculated in respective gradation patterns is calculated (step S1056).

Successively, an output density value of each density step is selected among the measured value data, In accordance with the calculated average shift quantity to correct the measurement timing (step S1057).

For example, in the case where measurements have been performed at five times of measurement timing to one density step and the measurement timing of the interpolated data R5 between the data Q and the data Q+1 has been detected as the timing at which the measurement of the head part of the gradation pattern C has started in FIG. 11, the measurements of the density step 5 must have been performed five times after the point of time when the data R5 has been measured. Accordingly, a piece of data to be applied as the output density value of the density step 5 is selected among the five pieces of measured value data measured after the measuring timing of the data R5, namely the data Q+1, Q+2, Q+3, Q+4 and Q+5. Among the pieces of the measured value data measured at the period of time when the measurement of the density step 5 is regarded to be started, for example, the measured value data Q+3 measured at a third order may be selected as the output density value, or an average value of the measured value data Q+3 and Q+4 measured at a third order and a fourth order, respectively, may be selected as a value to be applied as the output density value. Also with regard to the other density steps 4 to 1, the measured values to be applied as the output density values are similarly selected.

When the measured values to be applied as the output density values of the respective density steps have been selected to the respective gradation patterns In accordance with the shift quantity of the measurement timing, the logarithmic transformation of the selected measured values is performed, and the output density values are calculated. Thus, a measured curve indicating output density values to the input density values of the respective gradation patterns is calculated. A gradation correction curve of the output image is calculated based on the measured curve (step S106), and the gradation correction process is completed.

As described above, in the second embodiment, the reflected light quantities of a correcting image including a plurality of gradation patterns are measured, and the measurement timing of measured value data, which is near to an intermediate light quantity value, among the measured value data in the vicinity of specified timing, is regarded as the timing at which the measurement of the head part of a gradation pattern has been actually started based on the measurement results. Then, a shift quantity between the timing at which the measured value data near to the intermediate light quantity value has been measured and the specified timing is detected, and pieces of the measured value data to be applied as the output density values of respective density steps are selected In accordance with the detected shift quantity. Consequently, shifts of the measurement timing can be easily and accurately corrected based on the measurement results.

Moreover, in this case, because an output density value of each gradation is selected among each measured value in the timing correction process, timing corrections and the measured value selections at the time of gradation corrections can be simultaneously performed, and the processing steps of the gradation corrections can be reduced to realize the shortening of processing time. Moreover, because it is unnecessary to provide any specific pattern for detecting the measurement timing in a correcting image, the gradation corrections can be performed without increasing any costs.

Moreover, because a shift quantity of the measurement timing is calculated to each of a plurality of gradation patterns and an average value of the calculated plurality of shift quantities is obtained to be set as a final shift quantity of the measurement timing, the detection errors of the shift quantity can be reduced, and the stabler shift correction of the measurement timing can be performed.

Moreover, the maximum value Max and the minimum value mini are detected among the measured value data in the vicinity of the specified timing, and the intermediate light quantity value Midd is calculated. Consequently, even when measurement noises are generated in the vicinity of the specified timing and abnormal measured values are measured, the shift of the measurement timing can be corrected without being influenced by the measurement noises.

Incidentally, the description contents with regard to the second embodiment are a preferable example to which the image forming apparatus of the present invention is applied, and the present invention is not limited to the contents.

In the example described above, an average value of the shift quantity of the measurement timing detected in each gradation pattern is calculated, and the averaged shift quantity is applied to all of the gradation patterns to correct the shift of the measurement timing. The present invention is not limited to the method described above. The processing time necessary for the detection of the shift quantity may be shortened by applying the shift quantity of measurement timing detected to a first gradation pattern to all of the succeeding gradation patterns to correct their measuring timing by the same shift quantity. Alternatively, the shift quantity may be corrected by detecting a shift quantity to each gradation pattern to apply the detected shift quantity to each gradation pattern. For example, in the case where the shift quantity calculated to the gradation pattern B is designated by "b" and the shift quantity calculated to the gradation pattern C is designated by "c", the output density value of each density step is selected In accordance with the shift quantity "b" in the gradation pattern B, and the output density value of each density step is selected In accordance with the shift quantity "c" in the gradation pattern C, and so forth. In this case, it becomes possible to deal with a partial speed change.

Moreover, in the example described above, the output density value of each density step is selected In accordance with the detected shift quantity of measurement timing. However, the present invention is not limited to such a method. The measurement timing by the sensor 5 may be directly corrected by the shift quantity of the measurement timing.

Furthermore, in that case, the shift quantity of the measurement timing may be calculated just after the point of time when the measurement of a gradation pattern has been completed, and the measurement timing may be corrected by shifting the measurement timing at real time.

Moreover, a plurality of gradation patterns are provided in a correcting image, but only one gradation pattern may be provided to detect the shift quantity of the measurement timing based on the gradation pattern for correcting the shift of the measurement timing. By this method, the correction accuracy is not improved, but the toner quantity to be used for the correction can be decreased and the processing time necessary for the correction can be shortened.

Further, in the present embodiment, the shift of the measurement timing at the time when the gradation correction of the output image is performed by means of the correcting image (image to be detected) shown in FIG. 3 to correct the shift. However, the present invention can be also applied when other detections and corrections are desired.

In addition, the detailed configurations and the detailed operation of the image forming apparatus 1 of the second embodiment can be also changed suitably without departing from the scope and the sprit of the present invention.

The entire disclosure of Japanese Patent Application No. Tokugan 2003-163758 filed on Jun. 9, 2003 including specification, claims, drawings and summary are incorporated herein by reference in its entirety.

What is claimed is:

1. An image forming apparatus comprising:
an image forming unit for forming a correcting image for correcting gradations of an output image, on a bearing body;
a sensor for measuring a reflected light quantity of the correcting image formed on the bearing body;
a gradation correcting unit for correcting the gradations of the output image, based on a measurement result of the measured reflected light quantity of the correcting image; and
a timing correcting unit for detecting a shift of measurement timing at which the correcting image is measured by the sensor, based on the measurement result by the sensor, and for correcting the detected shift of the measurement timing;
wherein:
the gradation correcting unit corrects the gradations of the output image using the measurement result which is measured at the timing corrected by the timing correcting unit,
the correcting image comprises a gradation pattern comprising a plurality of gradations;
the sensor measures the reflected light quantity of the correcting image at a fixed interval timing; and
the timing correcting unit detects a timing of measurement of a measured value having a largest change of measured light quantity value between two adjacent sampling points in a vicinity of a specified timing, as a starting timing at which a measurement of a head part of the gradation pattern has actually been started, based on measured values measured at the fixed interval timing, wherein the specified timing is prescribed in advance as a timing at which the measurement of the head part of the gradation pattern is started, and wherein the timing correcting unit detects a shift between the specified timing and the start timing as the shift of the measurement timing.

2. An image forming apparatus comprising:
an image forming unit for forming a correcting image for correcting gradations of an output image, on a bearing body;
a sensor for measuring a reflected light quantity of the correcting image formed on the bearing body;
a gradation correcting unit for correcting the gradations of the output image, based on a measurement result of the measured reflected light quantity of the correcting image; and
a timing correcting unit for detecting a shift of measurement timing at which the correcting image is measured by the sensor, based on the measurement result by the sensor, and for correcting the detected shift of the measurement timing,
wherein:
the gradation correcting unit corrects the gradations of the output image using the measurement result which is measured at the timing corrected by the timing correcting unit,
the correcting image comprises a gradation pattern comprising a plurality of gradations;
the sensor measures the reflected light quantity of the correcting image at a fixed interval timing; and
the timing correcting unit detects a timing of measurement of a measured value near to an intermediate light quantity value of measured values in a vicinity of a specified timing as a starting timing at which a measurement of a head part of the gradation pattern has actually been started, based on measured values measured at the fixed interval timing, wherein the specified timing is prescribed in advance as a timing at which the measurement of the head part of the gradation pattern is started, and wherein the timing correcting unit detects a shift between the specified timing and the start timing as the shift of the measurement timing.

3. The image forming apparatus of claim 1, wherein the timing correcting unit corrects the measurement timing of the sensor by the shift quantity of the detected measurement timing.

4. The image forming apparatus of claim 1, wherein:
the timing correcting unit corrects the shift of the measurement timing by selecting the measured value to be applied as an output density value of each gradation in the gradation pattern among the respective measured values measured by the sensor according to the detected shift quantity of the measurement timing; and
the gradation correcting unit performs the gradation correction based on the measured value selected as the output density value of each gradation.

5. The image forming apparatus of claim 1, wherein:
the correcting image comprises a plurality of gradation patterns; and
the timing correcting unit detects the respective shift of the measurement timing from the plurality of gradation patterns, and performs the correction of the measurement timing by applying the shift quantities of the measurement timing, which are detected in the respective gradation patterns, to each of the gradation patterns.

6. The image forming apparatus of claim 1, wherein:
the correcting image comprises a plurality of gradation patterns; and
the timing correcting unit detects the respective shift of the measurement timing from the plurality of gradation patterns, and corrects the shift of the measurement timing by applying an average value of the shift quantities, which are detected in the respective gradation patterns, to all of the gradation patterns, as a common shift quantity.

7. The image forming apparatus of claim 5, wherein the plurality of gradation patterns are identical.

8. The image forming apparatus of claim 5, wherein the plurality of gradation patterns are different from one another.

9. The image forming apparatus of claim 1, wherein each gradation of the gradation pattern is formed in order that the measurement by the sensor is performed in an order from a high density gradation to a low density gradation.

10. The image forming apparatus of claim 1, wherein:
the correcting image comprises a plurality of colors;
the gradation correcting unit performs the gradation correction of each color based on the measured value of the reflected light quantity of the correcting image comprising the plurality of colors; and
the timing correcting unit corrects the shift of the measurement timing at every measurement of the reflected light quantity of the correcting image of each color.

11. The image forming apparatus of claim 1, wherein:
the bearing body is a transfer member; and
the sensor measures the reflected light quantity of the correcting image formed on the transfer member.

12. An image forming apparatus comprising:
an image forming unit for forming a correcting image, which is an image for correcting gradations of an output image and comprises a gradation pattern comprising a plurality of gradations, on a bearing body;
a sensor for measuring reflected light quantities of the correcting image formed on the bearing body at a fixed interval timing;
a gradation correcting unit for correcting the gradations of the output image, based on measurement results of the measured reflected light quantities of the correcting image; and
a timing correcting unit for detecting a timing of measurement of a measured value having a largest change of measured light quantity value between two adjacent sampling points in a vicinity of a specified timing is measured, as a starting timing at which a measurement of a head part of the gradation pattern has actually been started, based on measured values measured at the fixed interval timing, wherein the specified timing is prescribed in advance as a timing at which the measurement of the head part of the gradation pattern is started, and wherein the timing correcting unit detects a shift between the specified timing and the start timing as a shift of measurement timing and corrects the detected shift of the measurement timing;
wherein the gradation correcting unit corrects the gradations of the output image using the measurement results which are measured at the timing corrected by the timing correcting unit.

13. An image forming apparatus comprising:
an image forming unit for forming a correcting image, which is an image for correcting gradations of an output image and comprises a gradation pattern comprising a plurality of gradations, on a bearing body;
a sensor for measuring reflected light quantities of the correcting image formed on the bearing body at a fixed interval timing;
a gradation correcting unit for correcting the gradations of the output image, based on measurement results of the measured reflected light quantities of the correcting image; and
a timing correcting unit for detecting a timing of measurement of a measured value having a largest change of measured light quantity value between two adjacent sampling points in a vicinity of a specified timing is measured, as a starting timing at which a measurement of a head part of the gradation pattern has actually been started, based on measured values measured at the fixed interval timing, wherein the specified timing is prescribed in advance as a timing at which the measurement of the head part of the gradation pattern is started, and wherein the timing correcting unit detects a shift between the specified timing and the start timing as a shift of measurement timing, and corrects the detected shift of the measurement timing;
wherein the gradation correcting unit corrects the gradations of the output image using the measurement results which are measured at the timing corrected by the timing correcting unit.

14. A gradation correction method comprising:
forming a correcting image for correcting gradations of an output image, on a bearing body;
measuring a reflected light quantity of the correcting image formed on the bearing body by a sensor;
detecting a shift of measurement timing at which the correcting image is measured by the sensor, based on a measurement result by the sensor, and correcting the detected shift of the measurement timing; and
correcting the gradations of the output image using the measurement result which is measured at the corrected timing,
wherein:
the correcting image comprises a gradation pattern comprising a plurality of gradations;
the measuring is performed by measuring the reflected light quantity of the correcting image at a fixed interval timing; and
the detecting and the correcting of the shift is performed by detecting a timing of measurement of a measured value having a largest change of measured light quantity value between two adjacent sampling points in a vicinity of a specified timing as a starting timing at which a measurement of a head part of the gradation pattern has actually been started, based on measured values measured at the fixed interval timing, wherein the specified timing is prescribed in advance as a timing at which the measurement of the head part of the gradation pattern is started, and wherein a shift between the specified timing and the start timing is detected as the shift of the measurement timing.

15. A gradation correction method comprising:
forming a correcting image for correcting gradations of an output image, on a bearing body;
measuring a reflected light quantity of the correcting image formed on the bearing body by a sensor;
detecting a shift of measurement timing at which the correcting image is measured by the sensor, based on a measurement result by the sensor, and correcting the detected shift of the measurement timing; and
correcting the gradations of the output image using the measurement result which is measured at the corrected timing, wherein:
the correcting image comprises a gradation pattern comprising a plurality of gradations;
the measuring is performed by measuring the reflected light quantity of the correcting image at a fixed interval timing; and
the detecting and the correcting of the shift is performed by detecting a timing of measurement of a measured value near to an intermediate light quantity value of measured values in a vicinity of a specified timing as a start timing at which a measurement of a head part of the gradation pattern has actually been started, based on measured values measured at the fixed interval timing, wherein the specified timing is prescribed in advance as a timing at which the measurement of the head part of the gradation pattern is started, and wherein a shift between the specified timing and the start timing is detected as the shift of the measurement timing.

16. The gradation correction method of claim 14, wherein the detecting and the correcting of the shift is performed by correcting the measurement timing of the sensor by the shift quantity of the detected measurement timing.

17. The gradation correction method of claim 14, wherein:
the detecting and the correcting of the shift is performed by correcting the shift of the measurement timing by selecting the measured value to be applied as an output density value of each gradation in the gradation pattern among the respective measured values measured by the sensor according to the detected shift quantity of the measurement timing; and
the correcting of the gradations is performed by performing the gradation correction based on the measured value selected as the output density value of each gradation.

18. The gradation correction method of claim 14, wherein:
the correcting image comprises a plurality of gradation patterns; and
the detecting and the correcting of the shift is performed by detecting the respective shift of the measurement timing from the plurality of gradation patterns, and by performing the correction of the measurement timing by applying the shift quantities of the measurement timing, which are detected in the respective gradation patterns, to each of the gradation patterns.

19. The gradation correction method of claim 14, wherein:
the correcting image comprises a plurality of gradation patterns; and
the detecting and the correcting of the shift is performed by detecting the respective shift of the measurement timing from the plurality of gradation patterns, and by correcting the shift of the measurement timing by applying an average value of the shift quantities, which are detected in the respective gradation patterns, to all of the gradation patterns, as a common shift quantity.

20. The gradation correction method of claim 18, wherein the plurality of gradation patterns are identical.

21. The gradation correction method of claim 18, wherein the plurality of gradation patterns are different from one another.

22. The gradation correction method of claim 14, wherein each gradation of the gradation pattern is formed in order that the measurement by the sensor is performed in an order from a high density gradation to a low density gradation.

23. The gradation correction method of claim 14, wherein:
the correcting image comprises a plurality of colors;
the detecting and the correcting of the shift is performed by correcting the shift of the measurement timing at every measurement of the reflected light quantity of the correcting image of each color; and
the correcting of the gradations is performed by performing the gradation correction of each color based on the measured value of the reflected light quantity of the correcting image comprising the plurality of colors.

24. The gradation correction method of claim 14, wherein:
the bearing body is a transfer member; and
the measuring is performed by measuring the reflected light quantity of the correcting image formed on the transfer member.

* * * * *

UNITED STATES PATENT AND TRADEMARK OFFICE
CERTIFICATE OF CORRECTION

PATENT NO.         : 7,652,790 B2                                                              Page 1 of 1
APPLICATION NO. : 10/783370
DATED              : January 26, 2010
INVENTOR(S)        : Kousuke Touura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Twenty-third Day of November, 2010

David J. Kappos
*Director of the United States Patent and Trademark Office*